(12) United States Patent
Tsurumaru

(10) Patent No.: US 8,155,318 B2
(45) Date of Patent: Apr. 10, 2012

(54) QUANTUM CRYPTOGRAPHY COMMUNICATION SYSTEM

(75) Inventor: Toyohiro Tsurumaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1192 days.

(21) Appl. No.: 11/631,530

(22) PCT Filed: Jul. 6, 2004

(86) PCT No.: PCT/JP2004/009567
§ 371 (c)(1),
(2), (4) Date: Jan. 4, 2007

(87) PCT Pub. No.: WO2006/003715
PCT Pub. Date: Jan. 12, 2006

(65) Prior Publication Data
US 2007/0223698 A1    Sep. 27, 2007

(51) Int. Cl.
*H04L 29/06* (2006.01)
(52) U.S. Cl. .......................... 380/256; 380/278; 398/175
(58) Field of Classification Search .................. 380/256, 380/278; 398/175
See application file for complete search history.

(56) References Cited

U.S. PATENT DOCUMENTS

| | | | |
|---|---|---|---|
| 6,314,189 B1 * | 11/2001 | Motoyoshi et al. | 380/278 |
| 7,460,670 B1 * | 12/2008 | Elliott | 380/256 |
| 2004/0008843 A1 | 1/2004 | Van Enk | |
| 2004/0086280 A1 | 5/2004 | Duraffourg et al. | |
| 2004/0109564 A1 * | 6/2004 | Cerf et al. | 380/256 |
| 2008/0089696 A1 * | 4/2008 | Furuta | 398/175 |

FOREIGN PATENT DOCUMENTS

| | | |
|---|---|---|
| EP | 0 920 149 A2 | 6/1999 |
| JP | 2002-132146 | 5/2002 |
| JP | 2003298570 | 10/2003 |
| WO | WO-02/49267 A1 | 6/2002 |

OTHER PUBLICATIONS

Samuel J. Lomonaco Jr., A Quick Glance at Quantum Cryptography, Nov. 8, 1998, pp. 1-54.*

(Continued)

*Primary Examiner* — Vivek Srivastava
*Assistant Examiner* — Michael D Anderson
(74) *Attorney, Agent, or Firm* — Birch Stewart Kolasch & Birch, LLP

(57) ABSTRACT

In a system carrying out cryptography communication using a quantum, it is aimed to correctly verify a quantum state received at the commit phase according to the quantum bit string commitment system, even if not maintaining the quantum state until the open phase but immediately observing the quantum state. According to the present invention, the quantum cryptography communication system includes a sending device 1 and a receiving device 2 connected by a quantum communication channel 11 and a classical communication channel 12. A carrier sending unit 14 of the sending device 1 sends a quantum to the quantum communication channel 11, a carrier receiving unit 17 of the receiving device 2 receives the quantum and observes its quantum state. A receiving device controlling unit 16 computes using the observation result and data sent from a data sending unit 15 of the sending device 1 to a data receiving unit 18 of the receiving device 2 through the classical communication channel 12, and outputs the result of cryptography communication derived from the computation.

35 Claims, 7 Drawing Sheets

OTHER PUBLICATIONS

Sheng-Tzong Cheng/Chun-Yen Wang/Ming-Hon Tao, Quantum Communication for Wireless Wide-Area Networks, Mar. 30, 2004, pp. 1424-1432.*

Bennett et al., IEEE International Conference on Computers, Systems and Signal Processing, 1984, pp. 175-179.

Bennett, Physical Review Letters, vol. 68, No. 21, 1992, pp. 3121-3124.

Ekert, Physical Review Letters, vol. 67, No. 6, 1991, pp. 661-663.

Watanabe et al., 2003 Nen Ango to Joho Security Symposium Yokishu, vol. II, 2003, pp. 1219-1224.

Bennett et al., IEEE International Conference on Computers, Systems and Signal Processing, 1984, pp. 175-179.

Watanabe et al., 2003 Nen Ango to Joho Security Symposium Yokishu, vol. II, 2003, pp. 1219-1224.

Shimizu, Kaoru, et al., Physical Review A, vol. 66, 052316 (2002).

Shimizu, Kaoru et al., Physical Review A, vol. 67, 034301 (2003).

Kent, A., Phys. Rev. lett., vol. 90, 237901, 2003.

Okamoto, Tatsuaki et al., Modern Cryptography, Sangyo Tosho, 1997.

Suuri-Kagaku, Supplementary Volume, (Apr. 2003), Ryoshi-Joho-Kagaku to sono Tenkai (Quantum Information Science and its Development, Science-sha, 2003.

Bennett C., et al., Proceedings of IEEE International Conference on Computers, Systems and Signal Processing, pp. 175-179, 1984.

Lo, J.-K., et al., Phys. Rev. Lett., vol. 78, pp. 3410-3413, 1997.

Nielsen, M.A. et al., Cambridge Univ. Press, 2000.

Bennett, C.H. et al., Proceedings of Eurocrypt, 1990, pp. 253-265, Springer Verlag.

Bouwmeester, D. et al., The Physics of Quantum Information: Quantum Cryptography, Quantum Teleportation, Quantum Computation, Springer Verlag, 2000.

Bennett, C.H. et al., Phys. Rev. Lett., vol. 68, 3121, 1992.

Bennett et al., "Mixed-State Entanglement and Quantum Error Correction," *The American Physical Society*, vol. 54, No. 5, Nov. 1996, pp. 3824-3851.

Brassard, G. et al. "A Quantum Bit Commitment Scheme Provably Unbreakable by both Parties", Annual Symposium on Foundations of Computer Science, 1993, vol. 34, pp. 362-371.

* cited by examiner

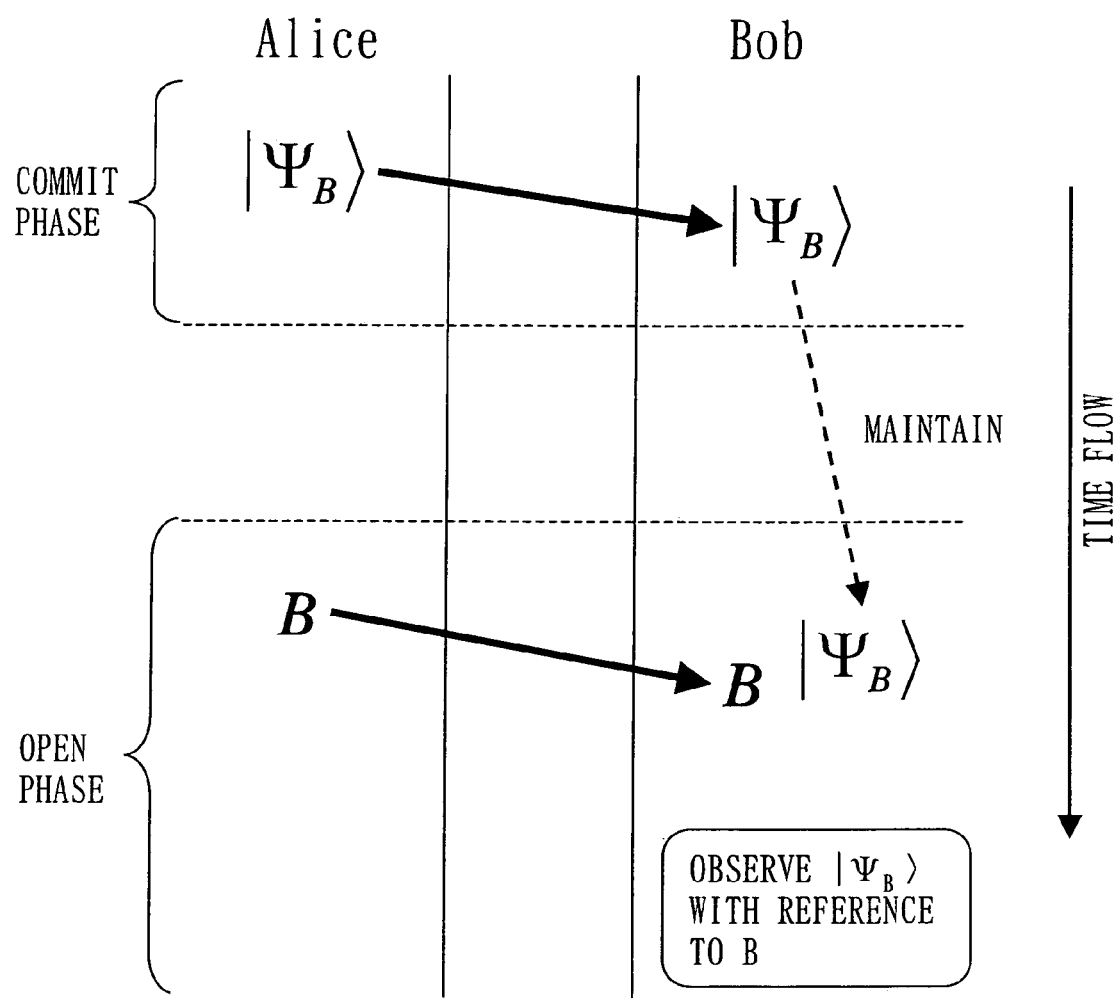

QUANTUM CRYPTOGRAPHY COMMUNICATION SYSTEM

TECHNICAL FIELD

The present invention relates to a system, a sending device, a receiving device, and a method for carrying out cryptography communication using a quantum.

BACKGROUND ART

Non-patent document 1 shows a conventional quantum bit string commitment (Quantum Bit String Commitment, QBSC). QBSC is a variation of bit commitment (Bit Commitment, BC; see Non-patent document 2, for example).

BC is a kind of cryptography protocols. An object of BC is to send an evidence of a bit $b \in \{0,1\}$ determined by a sender (Alice, hereinafter) at a certain time to a receiver (Bob, hereinafter) without sending the value b itself.

As an application of BC, for example, it is assumed that Alice and Bob play Japanese chess using a communication channel without actually facing each other. When one day's game is finished, in order to commit a sealed move, Alice records the result as b=0 or b=1. Or, if it is complex, the move is encoded into a bit string $B=(b_1, \ldots, b_n)$, and each $b_i$ is recorded.

At this time, Alice does not want to open the value of b to Bob until the next day and on the other hand, Bob wants Alice not to change the value of b later. However, since they play over the communication channel, it is impossible to write on paper and pack the paper in an envelope or a safe.

Accordingly, it is decided that Alice sends Bob a certain data string $D_b$ that can be an evidence. When the time comes to release the sealed move, b is opened to Bob. Bob compares b with $D_b$, and accepts that the sealed move is correct if there is no contradiction.

BC can be used as the sealed move, because BC is under condition that it is hard for Bob to obtain the value b from the value $D_b$, and furthermore it is hard for Alice to change b after sending $D_b$ (requirement of security of BC will be discussed later). Namely, BC plays a role of a safe or an envelope.

The above example is merely one of application forms. The importance of BC is that it is a basic component of various cryptography protocols (see Non-patent document 2). BC is also used for a protocol of well-known electronic voting.

Hereinafter, a series of operations in which Alice sends Bob an evidence of b is referred to as "commit phase (Commit Phase)," and to perform the operations is referred to as "to commit."

Further, a series of operations in which when a certain time period has passed after the commit phase, Alice opens b, and Bob compares b with the evidence to confirm that b is correct is referred to as "open phase (Open Phase)."

In the open phase, that Bob concludes "b is correct" is called "to accept (Accept) the commitment," and that Bob concludes "b is not correct, or the evidence is not enough to prove b is correct" is called "to reject (Reject) the commitment."

The commit phase of BC is defined as follows (refer to Non-patent document 2):

(A1) Alice determines a value of bit $b \in \{0, 1\}$.

(A2) Alice computes electronic data $D_b$ corresponding to b and sends (commits) to Bob.

(A3) Bob records the electronic data $D_b$ in a recording device to maintain.

Further, the open phase of BC is defined as follows (refer to Non-patent document 2):

(A4) Alice sends a value of bit b and associated information D' to Bob.

(A5) Bob computes using b, D', and $D_b$ and checks if there is contradiction among these values. If no contradiction, "Accept" is output (commitment is accepted). If there is contradiction, "Reject" is output (commitment is rejected).

Although various methods are known as a method to compose D' and $D_b$ corresponding to the bit b, here, it is noted a method using cryptologic hash function, for example. In this case, for computing $D_b$, Alice selects a random number $r \in \{0, 1\}^{R-1}$, and first obtains D=r||b by connecting b to r. Then, $D_b$=H(D) is computed using the cryptologic hash function H (SHA-1, for example).

At this time, grounds for security of BC is that it is difficult, when an output F of the cryptologic hash function is given, to obtain a corresponding input I (namely, I that satisfies F=H(I)). That is, difficulty of computing amount is the grounds for the security of BC.

Requirements for the security of BC is as follows (refer to Non-patent document 2):

(Concealing) It is difficult for Bob to know the value of b prior to the open phase.

(Binding) It is difficult for Alice to change the value of b after the commit phase.

Although BC is important as components of cryptography protocol, it is necessary to assume calculation amount difficulty in order to prove its security at present (see Non-patent document 2). However, due to the introduction of new algorithm and a quantum computer, etc., the calculation amount difficulty may be resolved (for example, in public key cryptography, difficulties of prime factorization problems and discrete logarithm problems are basis for security (see Non-patent Document 2, for example). However, if the quantum computer comes into practical use, these problems can be solved effectively, so that it is known that the public key cryptography loses its security (see Non-patent document 3).), so that it is impossible to guarantee absolute security.

On the other hand, in case of configuring cryptographic protocol based on quantum theory, the security can be absolute (see Non-patent document 3, for example). In fact, quantum key distribution (QKD, see Non-patent document 4) is known as an example of such. However, it is disclosed that it is impossible to guarantee the security of BC by using only quantum theory (Non-patent document 5). Then, by loosing the requirement for the security a little, QBSC is provided by implementing cryptography protocol (by quantum theory) similar to BC.

Hereinafter, quantum bit string commitment (QBSC) will be explained.

QBSC is a method to commit not a single bit but a bit string $B=(b_1, \ldots, b_m)$ at once (Non-patent document 1). It should be noted that this is different from individual operation of BC for each bit $b_i$. This is because the requirement for the security, in particular Concealing requirement has been changed. In QBSC, a certain limited number of bits can be leaked among information of the bit string B.

FIG. 7 shows a conceptual diagram showing a conventional quantum bit string commitment method shown in Non-patent document 1.

The commit phase of the method according to Non-patent document 1 is defined as follows:

(B1) Alice selects a bit string $B=(b_1, \ldots, b_m)$ that she wants to commit.

(B2) Alice sends Bob state $|\Psi_B\rangle$ corresponding to B through quantum channel.

(B3) Bob maintains the received $|\Psi_B\rangle$.

In the above procedure, the state $|\Psi_B\rangle$ that Alice sends Bob is "an evidence of the bit string B." However, even if there is $|\Psi_B\rangle$, information amount from which Alice can know about the bit string B is limited. The theoretical basis for this is given by Holevo's bound (see Non-patent document 6, for example).

"To send the state $|\Psi_B\rangle$" means to send a quantum having the state $|\Psi_B\rangle$. For example, in case of using light, it is assumed to consider polarization state as the state $|\Psi_B\rangle$. At this time, "to send the state $|\Psi_B\rangle$" means "to send light in a certain polarization state."

Since everything in the world consists of quantum, anything can be sent. However, whether the quantum state can be stably maintained is a different question, which depends on each quantum to be handled. For example, light is superior, because light can keep mutual interaction with environment small within fiber optic or free space, and it is often used in quantum key distribution (see Non-patent documents 2, 3 and 4). Polarization of a single photon is used as the earliest implementation method of the quantum key distribution (see Non-patent document 7 or 8). Further, in the quantum key distribution, another method, in which a phase difference between wave packets is used instead of the polarization state, is known (see Non-patent document 9).

Next, the open phase of Non-patent document 1 is defined as follows:

(B4) Alice sends Bob the bit string B through a classical channel.

(B5) Bob observes the maintained state $|\Psi_B\rangle$, and confirms if there is no contradiction between the observed result and the contents of the bit string B.

(B6) If there is any contradiction during the observation at step 2, Bob rejects Alice's commitment. If there is no contradiction, Bob accepts Alice's commitment.

Although requirements for the security in QBSC are similar to ones in case of BC, they are changed as follows:

Where $b_{lk}$, r, and $\epsilon$ are real constants that satisfy each of $m > b_{lk} > 0$ and $2^m > r > 0$, and $\epsilon > 0$, (Concealing) Upper limit of information amount of B which Bob knows prior to the open phase is equal to or less than $b_{lk}$ bits.

(Binding) At the open phase, it is assumed that there are r kinds of bit strings of $B_1, \ldots, B_r$ which Alice (who is dishonest) wants to open. Further, it is also assumed that probability of Bob's acceptance of each commitment is $P_1, \ldots, P_r$. At this time, $P_1 + \ldots + P_r < 1 + \epsilon$ is satisfied.

The above concealing requirements show that the information amount which Bob obtains from an evidence $|\Psi_B\rangle$ is equal to or less than $b_{lk}$ bits.

The above binding requirements show there is small possibility that Alice can change the value of the bit string B after the commit phase. For example, this is an image such that when Alice thinks it is sufficient to open any of 100 values of B afterwards, its success probability is around 1/100.

When each bit $b_i$ of the bit string $B = (b_1, \ldots, b_m)$ is committed through BC, none of bits of information of the B is leaked to Bob prior to the open phase. On the other hand, in case of QBSC, desired security is different, since the leakage up to $b_{lk}$ bits is allowed.

Non-patent Document 1: A. Kent, "Quantum Bit String Commitment," Phys. Rev. Lett., vol. 90, 237901, 2003

Non-patent Document 2: Tatsuaki Okamoto and Hiroshi Yamamoto, "Gendai Angou (Modern Cryptography)," Sangyo Tosho, 1997

Non-patent Document 3: "Supplementary volume: Suuri-Kagaku (April, 2003), Ryoshi-Joho-Kagaku to sono Tenkai (Quantum Information Science and its Development)," Science-sha, 2003

Non-patent Document 4: C. Bennett and G. Brassard, "Quantum Cryptography: Public Key Distribution and Coin Tossing," Proceedings of IEEE International Conference on Computers, Systems and Signal Processing, pp. 175-179, 1984

Non-patent Document 5: H. -K. Lo and H. F. Chau, "Is Quantum Bit Commitment Really Possible?," Phys. Rev. Lett., vol. 78, pp. 3410-3413, 1997

Non-patent Document 6: M. A. Nielsen and I. L. Chuang, "Quantum Computation and Quantum Information", Cambridge Univ. Press, 2000

Non-patent Document 7: C. H. Bennett et al., "Experimental Quantum Cryptography," Proceedings of Eurocrypt '90, pp. 253-265, Springer Verlag, 1990

Non-patent Document 8: D. Bouwmeester et al., "The Physics of Quantum Information: Quantum Cryptography, Quantum Teleportation, Quantum Computation," Springer Verlag, 2000

Non-patent Document 9: C. H. Bennett, "Quantum Cryptography Using Any Two Nonorthogonal States," Phys. Rev. Lett., vol. 68, 3121, 1992

DISCLOSURE OF THE INVENTION

Problems to be Solved by the Invention

In the conventional quantum bit string commitment method such as Non-patent document 1, the receiver Bob need to maintain the quantum state without any change until the open phase terminates (see FIG. 7). Because of this, it is almost impossible to put it to practical use when a time period from the commit phase to the open phase is long (at least one second, for example). At present, no technology exists to maintain a quantum state without any change for at least one second.

The present invention is provided to solve the above problems and aims to correctly verify the quantum state which the receiver receives even if the receiver observes at the stage of the commit phase.

Means to Solve the Problems

According to the present invention, a quantum cryptography communication system carrying out cryptography communication using a quantum, includes:

a quantum communication channel transmitting the quantum;

a classical communication channel transmitting data;

a sending device sending the quantum to the quantum communication channel and sending the data to the classical communication channel; and a receiving device receiving the quantum from the quantum communication channel and receiving the data from the classical communication channel, the sending device includes:

a sending device controlling unit inputting/outputting the data;

a carrier sending unit inputting the data from the sending device controlling unit and sending the quantum corresponding to the data input to the quantum communication channel; and a data sending unit inputting the data from the sending device controlling unit and sending the data input to the classical communication channel, and the receiving device includes:

a carrier receiving unit receiving the quantum sent to the quantum communication channel by the carrier sending unit and observing a quantum state of the quantum;

a memory unit storing an observation result of the quantum state observed by the carrier receiving unit;

a data receiving unit receiving the data sent to the classical communication channel by the data sending unit; and a receiving device controlling unit comparing the observation result stored by the memory unit with the data received by the data receiving unit.

The sending device controlling unit converts a bit string of the data to a codeword using an error correcting code;

the carrier sending unit inputs the codeword from the sending device controlling unit as the data and sending the quantum corresponding to the codeword input to the quantum communication channel;

the data sending unit inputs the bit string of the data from the sending device controlling unit as the data and sends the bit string input to the classical communication channel; and the receiving device controlling unit compares the observation result stored by the memory unit with the codeword converted from the bit string received by the data receiving unit using the error correcting code.

Further, according to the present invention, a quantum cryptography communication system carrying out cryptography communication using a photon, includes:

a quantum communication channel transmitting the photon;

a classical communication channel transmitting data;

a sending device sending the photon to the quantum communication channel and sending the data to the classical communication channel; and a receiving device receiving the photon from the quantum communication channel and receiving the data from the classical communication channel, the sending device includes:

a sending device controlling unit inputting/outputting the data;

a carrier sending unit inputting the data from the sending device controlling unit and sending the photon corresponding to the data input to the quantum communication channel; and a data sending unit inputting the data from the sending device controlling unit and sending the data input to the classical communication channel, and the receiving device includes:

a carrier receiving unit receiving the photon sent to the quantum communication channel by the carrier sending unit and observing a polarization state of the photon;

a memory unit storing an observation result of the polarization state observed by the carrier receiving unit;

a data receiving unit receiving the data sent to the classical communication channel by the data sending unit; and a receiving device controlling unit comparing the observation result stored by the memory unit with the data received by the data receiving unit.

The carrier receiving unit observes a linear polarization as the polarization state of the photon.

Further, according to the present invention, a quantum cryptography communication system carrying out cryptography communication using a photon, comprising:

a quantum communication channel transmitting the photon;

a classical communication channel transmitting data;

a sending device sending the photon to the quantum communication channel and sending the data to the classical communication channel; and a receiving device receiving the photon from the quantum communication channel and receiving the data from the classical communication channel, wherein the sending device includes:

a sending device controlling unit inputting/outputting the data;

a carrier sending unit inputting the data from the sending device controlling unit and sending the photon corresponding to the data input to the quantum communication channel; and a data sending unit inputting the data from the sending device controlling unit and sending the data input to the classical communication channel, and wherein the receiving device includes:

a carrier receiving unit receiving the photon sent to the quantum communication channel by the carrier sending unit and observing a phase difference of the photon;

a memory unit storing an observation result of a polarization state observed by the carrier receiving unit;

a data receiving unit receiving the data sent to the classical communication channel by the data sending unit; and a receiving device controlling unit comparing the observation result stored by the memory unit with the data received by the data receiving unit.

Further, according to the present invention, a quantum cryptography communication system carrying out cryptography communication using a quantum, includes:

a quantum communication channel transmitting the quantum;

a classical communication channel transmitting data;

a generating device sending the quantum to the quantum communication channel and receiving the data from the classical channel;

a sending device receiving the quantum from the quantum communication channel and sending the data to the classical communication channel; and a receiving device receiving the quantum from the quantum communication channel and receiving the data from the classical channel, the generating device includes:

a generating device communicating unit receiving setting information for generating an EPR (Einstein-Podolsky-Rosen) pair;

a generating device controlling unit controlling generation of the EPR pair based on the setting information received by the generating device communicating unit; and an EPR pair generating unit generating the EPR pair according to an instruction of the generating device controlling unit and sending one piece of the EPR pair to the quantum communication channel, the sending device includes:

a sending device controlling unit inputting/outputting the data;

a sending device carrier receiving unit receiving the one piece of the EPR pair sent to the quantum communication channel by the EPR pair generating unit and observing a quantum state of the one piece of the EPR pair; and a data sending unit sending an observation result of the quantum state observed by the sending device carrier receiving unit to the classical communication channel, inputting the data from the sending device controlling unit, and sending the data input to the classical communication channel, and the receiving device includes:

a receiving device carrier receiving unit receiving another piece of the EPR pair sent to the quantum communication channel by the EPR pair generating unit and observing a quantum state of the other piece of the EPR pair;

a data receiving unit receiving the observation result and the data sent to the classical communication channel by the data sending unit;

a memory unit storing the observation result received by the data receiving unit and an observation result of the quantum state observed by the receiving device carrier receiving unit; and a receiving device controlling unit comparing the observation results stored by the memory unit with the data received by the data receiving unit.

Further, according to the present invention, a quantum cryptography communication system carrying out cryptography communication using a quantum, includes:

a quantum communication channel transmitting the quantum;

a classical communication channel transmitting data;

a sending device sending the quantum to the quantum communication channel and sending the data to the classical communication channel; and a receiving device receiving the quantum from the quantum communication channel and receiving the data from the classical communication channel, the sending device includes:

a sending device controlling unit inputting/outputting the data;

an EPR pair generating unit generating an EPR (Einstein-podolsky-Rosen) pair, sending one piece of the EPR pair to the quantum communication channel, and observing a quantum state of another piece of the EPR pair; and a data sending unit sending an observation result of the quantum state observed by the EPR generating unit to the classical communication channel, inputting the data from the sending device controlling unit, and sending the data input to the classical communication channel, and the receiving device includes:

a carrier receiving unit receiving the one piece of the EPR pair sent to the quantum communication channel by the EPR pair generating unit and observing a quantum state of the one piece of the EPR pair;

a data receiving unit receiving the observation result and the data sent to the classical communication channel by the data sending unit;

a memory unit storing the observation result received by the data receiving unit and an observation result of the quantum state observed by the carrier receiving unit; and a receiving device controlling unit comparing the observation results stored by the memory unit with the data received by the data receiving unit.

Further, according to the present invention, a quantum cryptography communication system carrying out cryptography communication using a quantum, includes:

a quantum communication channel transmitting the quantum;

a classical communication channel transmitting data;

a sending device receiving the quantum from the quantum communication channel and sending the data to the classical communication channel; and a receiving device sending the quantum to the quantum communication channel and receiving the data from the classical communication channel, the receiving device includes an EPR pair generating unit generating an EPR (Einstein-Podolsky-Rosen) pair, sending one piece of the EPR pair to the quantum communication channel, and observing a quantum state of another piece of the EPR pair, the sending device includes:

a sending device controlling unit inputting/outputting data;

a carrier receiving unit receiving the one piece of the EPR pair sent to the quantum communication channel by the EPR pair generating unit and observing a quantum state of the one piece of the EPR pair; and a data sending unit sending an observation result of the quantum state observed by the carrier receiving unit to the classical communication channel, inputting the data from the sending device controlling unit, and sending the data input to the classical communication channel, and the receiving device further includes:

a data receiving unit receiving the observation result and the data sent to the classical communication channel by the data sending unit;

a memory unit storing the observation result received by the data receiving unit and an observation result of the quantum state observed by the EPR pair generating unit; and a receiving device controlling unit comparing the observation results stored by the memory unit with the data received by the data receiving unit.

According to the present invention, a receiving device carrying out cryptography communication using a quantum with a sending device sending the quantum and data, includes:

a carrier receiving unit receiving the quantum sent by the sending device and observing a quantum state of the quantum;

a memory unit storing an observation result of the quantum state observed by the carrier receiving unit;

a data receiving unit receiving the data sent by the sending device; and a receiving device controlling unit comparing the observation result stored by the memory unit with the data received by the data receiving unit.

The receiving device controlling unit compares the observation result stored by the memory unit with a codeword converted from a bit string of the data received by the data receiving unit using an error correcting code.

Further, according to the present invention, a receiving device carrying out communication with a sending device sending a photon and data, includes:

a carrier receiving unit receiving the photon sent by the sending device and observing a polarization state of the photon;

a memory unit storing an observation result of the polarization state observed by the carrier receiving unit;

a data receiving unit receiving the data sent by the sending device; and a receiving device controlling unit comparing the observation result stored by the memory unit with the data received by the data receiving unit.

The carrier receiving unit observes a linear polarization as the polarization state of the photon.

Further, according to the present invention, a receiving device carrying out communication with a sending device sending a photon and data, includes:

a carrier receiving unit receiving the photon sent by the sending device and observing a phase difference of the photon;

a memory unit storing an observation result of a polarization state observed by the carrier receiving unit;

a data receiving unit receiving the data sent by the sending device; and a receiving device controlling unit comparing the observation result stored by the memory unit with the data received by the data receiving unit.

Further, according to the present invention, a receiving device carrying out communication with a generating device generating an EPR (Einstein-Podolsky-Rosen) pair and sending a piece of the EPR pair and a sending device observing the piece of the EPR pair and sending data, the receiving device includes:

a receiving device carrier receiving unit receiving one piece of the EPR pair sent by the generating device and observing a quantum state of the piece of the EPR pair;

a data receiving unit receiving an observation result of another piece of the EPR pair and the data sent by the sending device;

a memory unit storing the observation result received by the data receiving unit and an observation result of the quantum state observed by the receiving device carrier receiving unit; and a receiving device controlling unit comparing the observation results stored by the memory unit with the data received by the data receiving unit.

Further, according to the present invention, a receiving device carrying out communication with a sending device generating an EPR (Einstein-Podolsky-Rosen) pair, observing a piece of the EPR pair, and sending data, the receiving device includes:

a carrier receiving unit receiving one piece of the EPR pair sent by the sending device and observing a quantum state of the piece of the EPR pair;

a data receiving unit receiving an observation result of another piece of the EPR pair and the data sent by the sending device;

a memory unit storing the observation result received by the data receiving unit and an observation result of the quantum state observed by the carrier receiving unit; and a receiving device controlling unit comparing the observation results stored by the memory unit with the data received by the data receiving unit.

Further, according to the present invention, a receiving device carrying out communication with a sending device observing a piece of an EPR (Einstein-Podolsky-Rosen) pair and sending data, the receiving device includes:

an EPR pair generating unit generating the EPR pair, sending one piece of the EPR pair to the sending device, and observing a quantum state of another piece of the EPR pair;

a data receiving unit receiving an observation result of the one piece of the EPR pair and the data sent by the sending device;

a memory unit storing the observation result received by the data receiving unit and an observation result of the quantum state observed by the EPR pair generating unit; and a receiving device controlling unit comparing the observation results stored by the memory unit with the data received by the data receiving unit.

According to the present invention, a sending device carrying out communication with a generating device generating an EPR (Einstein-Podolsky-Rosen) pair and sending a piece of the EPR pair and a receiving device observing the piece of the EPR pair and receiving data, the sending device includes:

a sending device controlling unit inputting/outputting data;

a sending device carrier receiving unit receiving one piece of the EPR pair sent by the generating unit and observing a quantum state of the piece of the EPR pair; and a data sending unit sending an observation result of the quantum state observed by the sending device carrier receiving unit to the receiving device, inputting the data from the sending device controlling unit, and sending the data input to the receiving device.

Further, according to the present invention, a sending device carrying out communication with a receiving device observing a piece of an EPR (Einstein-Podolsky-Rosen) pair and receiving data, the sending device includes:

a sending device controlling unit inputting/outputting data;

an EPR pair generating unit generating the EPR pair, sending one piece of the EPR pair to the receiving device, and observing a quantum state of another piece of the EPR pair; and a data sending unit sending an observation result of the quantum state observed by the EPR pair generating unit to the receiving device, inputting the data from the sending device controlling unit, and sending the data input to the receiving device.

Further, according to the present invention, a sending device carrying out communication with a receiving device generating an EPR (Einstein-Podolsky-Rosen) pair, observing a piece of the EPR pair, and receiving data, the sending device includes:

a sending device controlling unit inputting/outputting data;

a carrier receiving unit receiving one piece of the EPR pair sent by the receiving device and observing a quantum state of the one piece of the EPR pair; and a data sending unit sending an observation result of the quantum state observed by the carrier receiving unit, inputting the data from the sending device controlling unit, and sending the data input to the receiving device.

According to the present invention, a quantum cryptography communication method for carrying out communication between a sending device sending a quantum to a quantum communication channel transmitting the quantum and sending data to a classical communication channel transmitting the data and a receiving device receiving the quantum from the quantum communication channel and receiving the data from the classical communication channel, the method includes:

a sending device controlling step by the sending device for inputting/outputting the data;

a carrier sending step by the sending device for sending the quantum corresponding to the data input by the sending device controlling step to the quantum communication channel;

a carrier receiving step by the receiving device for receiving the quantum sent to the quantum communication channel by the carrier sending step and for observing a quantum state of the quantum;

a storing step by the receiving device for storing an observation result of the quantum state observed by the carrier receiving step;

a data sending step by the sending device for sending the data input by the sending device controlling step to the classical communication channel;

a data receiving step by the receiving device for receiving the data sent to the classical communication channel by the data sending step; and a receiving device controlling step by the receiving device for comparing the observation result stored by the storing step with the data received by the data receiving step.

Effect of the Invention

According to the present invention, it is unnecessary to maintain the quantum state for a long time, which brings an effect that QBSC can be easily implemented.

Further, according to the present invention, state of each quantum carrier can be separately generated, and quantum entanglement (Quantum Entanglement) between different carriers is not needed, which facilitates the implementation.

Here, it is assumed that "carrier" indicates "physical object" which is used for transmitting the quantum states. The physical object indicates in principal everything which can be described in the quantum mechanics. Transmission of the quantum state is carried out by moving spatially this physical object Preferred Embodiments for Carrying out the Invention In the following first through sixth embodiments, everything in the world (in addition to every substance, including field (gauge field) which transmits force like electromagnetic wave) is a quantum, and its state is a quantum state. Therefore, everything can be used as a carrier. To cite instances, it includes gauge field such as electromagnetic wave, gravitational field, elemental particles such as electrons, and their composite particles, atoms, atomic nucleus, molecules, compounds, and their combinations.

Embodiment 1

FIG. 1 shows a block diagram showing configuration of a quantum cryptography communication system according to the present embodiment.

A quantum communication channel 11 is a communication channel to sends and receives a quantum between a sending device (Alice) and a receiving device (Bob).

A classical communication channel 12 is a communication channel to carry out normal communication (communication not for sending a quantum state but for sending digital or analog data) and is implemented on, for example, telephone lines, optical fibers, the Internet, electric wave, etc.

A sending device controlling unit 13 of a sending device 1 and a receiving device controlling unit 16 of a receiving device 2 carry out data input, operation, recordation, random number generation, etc., and are implemented on programs, etc. of a computer.

A carrier sending unit 14 of the sending device 1 generates a quantum carrier according to an instruction of the sending device controlling unit 13, and after setting its quantum state to a desired state, sends out to the quantum communication channel 11.

A data sending unit 15 of the sending device 1 and a data receiving unit 18 of the receiving device 2 carry out communication through the classical communication channel 12, and the data sending unit 15 and the data receiving unit 18 send/receive data according to instructions of the sending device controlling unit 13 and the receiving device controlling unit 16, respectively. The data sending unit 15 and the data receiving unit 18 are implemented on, for example, a modem, a LAN (Local Area Network) card, a telephone set, a radio wave transceiver, etc.

A carrier receiving unit 17 of the receiving device 2 receives a quantum carrier according to an instruction of the receiving device controlling unit 16 and observes its quantum state.

The receiving device controlling unit 16 receives the observation result from the carrier receiving unit 17 and records the observation result in a memory unit 19. Further, computation is done using the observation result recorded in the memory unit 19 and the data received by the data receiving unit 18, and the result of cryptography communication which is derived from the computation is output.

FIG. 2 shows a conceptual diagram showing a quantum bit string commitment method according to the present embodiment. Further, FIG. 3 is a flow diagram showing a quantum cryptography communication method according to the present embodiment.

In the present embodiment, the following shows operation procedure in which Alice is the sending device 1 and Bob is the receiving device 2.

First, it is assumed that a data string which Alice wants to commit is a q element character string $A=(a_1, \ldots, a_n)$ (here, $a_i \in \{0, \ldots, q-1\}$) having n characters. When the original data is a bit string $B=(b_1, \ldots, b_m)$, it is converted to the q element character string $A=(a_1, \ldots, a_n)$ having n characters by an arbitrary injection F: $\{0,1\}^m \to \{0, \ldots, q-1\}^n$.

Next, as a q element classical code, a (N, n, d) code E: $\{0, \ldots, q-1\}^n \to \{0, \ldots, q-1\}^N$ is selected (parameters N and d of the code E are determined based on the security level required by a user of Alice. Generally, it is considered when d is large, the Binding requirement is greatly satisfied. Here, it is assumed that $N \geq n$ and $d \geq 0$, and an identify mapping is regarded as a kind of codes).

It is assumed that the commitment is carried out by sending a plurality of quantum. Further, each of the states is represented by D-dimensional complex vector and is expressed by $|\phi(0)\rangle, \ldots, |\phi(q-1)\rangle$.

As a base for the above observation of quantum, $M=\{M(1), \ldots, M(l)\}$ is selected. It is assumed that each of M(i) is an orthonormal base of D-dimensional complex vector space, and it is expressed by $M(i)=\{|M(i);0\rangle, \ldots, |M(i); D-1\rangle\}$.

Further, for any i, j that satisfies $|\phi(i)\rangle \in M(j)$ exists (at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$).

It is assumed that $t \geq 1$ is an integer constant (one of security parameters), and k is an integer variable.

The following shows operation procedure of the commit phase of Alice and Bob according to the present embodiment.

(C1) Alice computes a q-element codeword $E(B)=(e_1, \ldots, e_N) \in \{0, \ldots, q-1\}^N$ corresponding to a bit string B to be committed.

(C2) Bob generates l-element random string $R=(r_1, \ldots, r_N) \in \{1, \ldots, 1\}^N$.

(C3) Alice sends Bob the quantum state $|\phi(e_1)\rangle, \ldots, |\phi(e_N)\rangle$ (this can be the same as the state $|\Psi_B\rangle$ being expressed as the following expression (1), when inferring from the conventional method such as disclosed in Non-patent document 1 (this is because respective states $|\phi(e_1)\rangle$ do not have correlation if the states can be expressed by a tensor product).).

[Expression 1]

$$|\Psi_B\rangle = |\psi(e_1)\rangle \otimes \ldots \otimes |\psi(e_N)\rangle \qquad (1)$$

(C4) For $i=1, \ldots, N$, Bob observes $|\phi(e_1)\rangle$ using a base $M(r_i)$, and records the result as $s_i$. That is, if the observed state is $|M(r_i); j\rangle$, it is set as $s_i \leftarrow j$ (at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$). Hereinafter, these results are collectively expressed as $S=(s_1, \ldots, s_N)$.

In the procedure shown in Non-patent document 1, Bob observes the state $|\Psi_B\rangle$ after the bit string B is opened (see FIG. 7). However, in this embodiment, Bob does observation according to the value of the random number string R even if the bit string B is not known.

That is, in this case, Bob does not maintain the state $|\phi(e_1)\rangle, \ldots, |\phi(e_N)\rangle$ sent by Alice as it is, but maintains the observed result S as an evidence.

It is assumed that Alice is not dishonest, and also for a certain i, $|\phi(e_i)\rangle \in M(r_i)$. At this time, the state $|\psi(e_i)\rangle$ which Alice must have sent is always to match the state $|M(r_i); s_i\rangle$ observed by Bob (at this time, states that differ merely in complex phases are deemed as identical. Namely, for a certain real number θ, $|\phi\rangle$ and $|\phi'\rangle$ are deemed as identical that satisfy $|\phi\rangle = e^{i\theta}|\phi'\rangle$).

Next, the following shows operation procedure of the open phase of Alice and Bob according to the present embodiment.

(C5) Alice sends Bob the bit string B.

(C6) Bob computes the codeword $E(B) = (e_1, \ldots, e_N) \in \{0, \ldots, q-1\}^N$.

(C7) Bob sets k←0.

(C8) For i=1, ..., N, if $|\phi(e_1)\rangle \in M(r_i)$ and also $|\phi(e_i)\rangle \neq |M(r_i); s_i\rangle$, it is set as k←k+1 (at this time, states that differ merely in complex phases are deemed as identical. Namely, for a certain real number θ, $|\phi\rangle$ and $|\phi\rangle$ are deemed as identical that satisfy $|\phi\rangle = e^{i\theta}|\phi'\rangle$).

(C9) If k≧t, Bob rejects Alice's commitment. If k<t, Bob accepts Alice's commitment.

For a certain i, it is assumed that the following conditions are satisfied $$|\phi(e_i)\rangle \in M(r_i) \qquad (2)$$

$$|\phi(e_1)\rangle \neq |M(r_i); s_i\rangle \qquad (3)$$

$$(2) \text{ and also } (3) \qquad (4)$$

(at this time, states that differ merely in complex phases are deemed as identical. Namely, for a certain real number θ, $|\phi\rangle$ and $|\phi'\rangle$ are deemed as identical that satisfy $|\phi\rangle = e^{i\theta}|\phi'\rangle$). At this time, Bob is able to be convinced the state of i-th quantum sent by Alice is $|\phi(e_i)\rangle$. On the contrary, if the expression (4) is not established for at least one of $i \in \{1, \ldots, N\}$, Bob judges that Alice falsified.

However, practically, there exists noise in the communication channel or observation errors. Because of this, even if Alice is not dishonest, the expression (4) may be established at a certain probability. Therefore, by setting a threshold value t≧1, when i that satisfies the expression (4) is less than t, it is defined that the commitment should be accepted. A concrete value of t is determined according to a noise in the communication channel and an observation error.

The above steps (C7) through (C9) are an example of procedures for the above judgment, and the method shown above using the variable k is also merely one of examples.

Embodiment 2

According to this embodiment, in the same configuration as the first embodiment (see FIG. 1), a single photon (Single Photon) is used as a carrier, and its polarization is used as a quantum state.

In the present embodiment, the quantum communication channel 11 is mounted on, for example, free space or fiber optic.

The carrier sending unit 14 of the sending device 1 generates a single photon according to an instruction of the sending device controlling unit 13, and after setting its polarization state, sends to the quantum communication channel 11. In order to obtain different kinds of polarization states, for example, the generated single photon is put through a polarizing beam splitter, and its polarization is rotated or an optical circulator is used. Instead of the single photon, it is possible to use weak light which can be approximately considered as a single photon.

The carrier receiving unit 17 of the receiving device 2 receives a single photon according to an instruction of the receiving device controlling unit 16 and observes its polarization state. For example, it is possible to observe the received single photon by putting through a polarizing beam splitter (Beam Splitter). In addition, instead of the polarization, a phase difference can be also used.

In the present embodiment, the following shows operation procedure in which Alice is the sending device 1 and Bob is the receiving device 2.

Although only linear polarization is considered as the polarization state to facilitate explanation here, any kinds of polarization is applicable in general.

Further, by the same reason, although a case in which the number q of states $|\phi(a)\rangle$ is even is considered and it is assumed that q=2p, any number is applicable to q. Generally, a polarization state of a photon is expressed by two-dimensional complex vector $|\phi_\theta\rangle = (\alpha, \beta)$, and from this, q states $|\phi(a)\rangle$ are arbitrarily selected.

Linear polarization state of a single photon can be expressed using a certain base as $|\phi(\theta)\rangle = (\cos\theta, \sin\theta)$. Next, using this, the state $|\phi((a))\rangle$ (here, a=0, ..., 2p−1) is selected as follows:

$$|\phi(a)\rangle = (\cos(a\pi/2p), \sin(a\pi/2p))$$

This corresponds to the state in which an angle of polarization is $a\pi/2p$.

Therefore, in this case, "to send the quantum state $|\phi(a)\rangle$" means to send a single photon which includes linear polarization having an angle of $a\pi/2p$.

"To observe the quantum state $|\phi\rangle$" means to observe polarization of the photon.

For example, $M(a) = \{|\phi(a)\rangle, |\phi(a+p)\rangle\}$ is an orthogonal base, and this corresponds to observation distinguishing between two states having angles $\theta = a\pi/2p$ and $\theta = (a+p)\pi/2p$.

Here, it is assumed that $|M(a); 0\rangle = |\phi(a)\rangle$, $|M(a); 1\rangle = |\phi(a+p)\rangle$.

It is assumed that the base M(i) for observation can be arbitrarily selected. However, for any i, j that satisfies $|\phi(i)\rangle \in M(j)$ exists.

The following alphabet strings B, E(B), R, and S and variables i, j, and k are data strings. For example, when the sending device controlling unit 13 and the receiving device controlling unit 16 are implemented by a computer, these are values recorded in memories or registers.

The carrier sending unit 14 and the data sending unit 15 inside Alice operate according to an instruction from the sending device controlling unit 13.

The carrier receiving unit 17 and the data receiving unit 18 inside Bob operate according to an instruction from the receiving device controlling unit 16.

The following shows operation procedure of the commit phase of Alice and Bob according to the present embodiment.

(D1) The sending device controlling unit 13 of Alice records a bit string input by a user or an outside device.

(D2) The sending device controlling unit 13 of Alice computes 2p-element codeword $E(B) = (e_1, \ldots, e_N)$ corresponding to B.

(D3) The receiving device controlling unit 16 of Bob generates p-element random number string $R = (r_1, \ldots, r_N)$.

(D4) For i=1, ..., N, the carrier sending unit 14 of Alice generates a single photon having polarization angled by $\pi e_i / 2p$ and sends the photon to the carrier receiving unit 17 of Bob through the quantum communication channel 11.

(D5) For i=1, ..., N, the carrier receiving unit 17 of Bob observes the polarization of the i-th photon by the angle of $\pi r_i/2p$ and sends the observation result to the receiving device controlling unit 16. The receiving device controlling unit 16 records the observation result as $s_i=0$ when the angle of the observed polarization is $\pi r_i/2p$, and as $s_i=1$ when the angle is $\pi(r_i+p)/2p$. Hereinafter, these results are collectively expressed as $S=(s_1, \ldots, s_N)$.

To briefly summarize the above, Alice generates polarization angled by $\pi e_i/2p$, and Bob observes it by the angle of $\pi r_i/2p$.

If Alice is not dishonest and there is no observation error, for each i, $s_i=(e_i-r_i)/p$ is established if $r_i \equiv e_i \mod (p)$.

Next, the following shows operation procedure of the open phase of Alice and Bob according to the present embodiment.

(D6) The sending device controlling unit 13 of Alice sends the bit string B to the data receiving unit 18 of Bob through the classical communication channel 12. The data receiving unit 18 sends the result to the receiving device controlling unit 16.

(D7) The receiving device controlling unit 16 of Bob computes the codeword E(B).

(D8) The receiving device controlling unit 16 of Bob sets k←0.

(D9) For i=1, ..., N, when $r_i \equiv e_i \mod (p)$, k←k+1 if $s_i \neq (e_i-r_i)/p$.

(D10) If k≧t, the receiving device controlling unit 16 of Bob outputs reject (Reject). If k<t, the receiving device controlling unit 16 of Bob outputs accept (Accept).

Here, the linear polarization is considered, "states having different polarization by 90 degrees" means the same states as "orthogonal states." Namely, each of the base M(i) includes two states having difference of 90 degrees.

Accordingly, for i that satisfies $r_i \equiv e_i \mod (p)$, $|\phi(e_i)\rangle \in M(r_i)$ is fulfilled, and if $s_i=(e_i-r_i)/p$, $|\phi(e_i)\rangle \neq |M(r_i); s_i\rangle$ is fulfilled.

When the condition $$r_i \equiv e_i \mod (p) \text{ and also } s_i=(e_i-r_i)/p \quad (5)$$

is satisfied, Bob is able to be convinced that the i-th photon sent by Alice is truly $|\phi(e_i)\rangle$. The above steps (D8) through (D10) are one of examples of procedure to count the number of 'i's that satisfy the expression (5). The method discussed here using the variable k is also merely one of examples.

In the present embodiment, it is possible to implement QBSC using an optical system similarly to the conventional quantum key distribution. Further, there is no need to maintain the quantum state for a long time (see FIG. 2). Therefore, the embodiment brings the effect that QBSC can be implemented by using currently available technique.

Embodiment 3

Instead of sending the quantum state $|\Psi_B\rangle$ like the first embodiment, there is another way to implement QBSC by sharing entangled quantum state by Alice and Bob.

FIG. 4 shows a block diagram showing a configuration of quantum cryptography communication system according to the present embodiment.

A quantum communication channel 21 is a communication channel that sends/receives a quantum among the sending device (Alice) 3, the receiving device (Bob) 4, and the generating device (Chuck) 5.

A classical communication channel 22 is a communication channel that carries out normal communication (instead of sending the quantum state, but sending digital or analog data) among the sending device 3, the receiving device 4, and the generating device 5, and is implemented on, for example, telephone lines, fiber optic, the Internet, electric wave, etc.

A sending device controlling unit 23 of the sending device 3 and a receiving device controlling unit 26 of the receiving device 4 carry out data input, computation, recordation, random number generation, etc., and is implemented by programs of a computer.

A data sending unit 25 of the sending device 3, a data receiving unit 28 of the receiving device 4, and a generating device communicating unit 33 of the generating device 5 carry out communication through the classical communication channel 22, and the data sending unit 25, the data receiving unit 28, and the generating device communicating unit 33 send/receive data according to instructions of the sending device controlling unit 23, the receiving device controlling unit 26, and a generating device controlling unit 31, respectively. The data sending unit 25, the data receiving unit 28, and the generating device communicating unit 33 are implemented on, for example, a modem, a LAN card, a telephone set, a radio wave transceiver, etc.

An EPR (Einstein-Podolsky-Rosen) pair generating unit 32 of the generating device 5 generates entangled quantum state which is called an EPR pair according to an instruction of the generating device controlling unit 31, and sends to a quantum communication channel 21.

The generating device controlling unit 31 issues the above instruction to generate an EPR pair to an EPR pair generating unit 32 based on the setting information received from the sending device controlling unit 23 by the generating device communicating unit 33. The generating device controlling unit 31 is implemented on programs of a computer, etc.

A sending device carrier receiving unit 24 of the sending device 3 receives a quantum carrier according to the instruction of the sending device controlling unit 23 and observes its quantum state.

The sending device controlling unit 23 receives the observation result from the sending device carrier receiving unit 24, computes the observation result, and sends to the classical communication channel 22 through the data sending unit 25.

A receiving device carrier receiving unit 27 of the receiving device 4 receives a quantum carrier according to the instruction of the receiving device controlling unit 26 and observes its quantum state.

The receiving device controlling unit 26 receives the observation result from the receiving device carrier receiving unit 27 and records the observation result in a memory unit 29. Further, after received by the data receiving unit 28, the observation result of the sending device carrier receiving unit 24 of the sending device 3 is recorded in the memory unit 29. Further, computation is done using the observation result recorded in the memory unit 29 and the data received by the data receiving unit 28, and the result of cryptography communication which is derived from the computation is output.

In the present embodiment, the following shows operation procedure in which Alice is the sending device 1, Bob is the receiving device 2, and Chuck is the generating device 5.

It is known that in two-dimensional complex vector space, an entangled quantum state called as an EPR pair can be formed. A concrete form of an EPR pair is $|\Psi_{EPR}\rangle = 1/\sqrt{2}(|\uparrow\rangle_A|\downarrow\rangle_B - |\downarrow\rangle_A|\uparrow\rangle_B)$. Alice, Bob, or a third party generates this state, and sends the state of the subscript A to Alice and the state of the subscript B to Bob.

Here, as an example, an arbitrary orthonormal base $\{|\Psi_1\rangle, |\Psi_2\rangle\}$ is considered. And when both Alice and Bob use this base to measure $|\Psi_{EPR}\rangle$, respective measured states are always different. Using this, commitment of the state is carried out.

First, it is assumed that a data string to be committed is a q(=2p)-element character string $A=(a_1, \ldots, a_n)$ (here, $a_i \in \{0, \ldots, q-1\}$) having n characters. When the original data is a bit string $B=(b_1, \ldots, b_m)$, it is converted to the q-element character string $A=(a_1, \ldots, a_n)$ having n characters by an arbitrary injection $F: \{0,1\}^m \rightarrow \{0, \ldots, q-1\}^n$.

Next, as a q-element classical code, a (N, n, d) code $E: \{0, \ldots, q-1\}^n \rightarrow \{0, \ldots, q-1\}^N$ is selected.

As a base for observing the above quantum, $M = \{M(1), \ldots, M(p)\}$ is selected. It is assumed that each of M(i) is an orthonormal base of two-dimensional complex vector space, and it is expressed as $M(i) = \{|M(i); 0\rangle, |M(i); 1\rangle\}$.

It is assumed that $t \geq 1$ is an integer constant (one of security parameters), and k is an integer variable.

The following shows operation procedure of the commit phase of Alice and Bob according to the present embodiment.

(E1) Chuck generates N sets of EPR pairs and sends one piece of each pairs of the states to Alice and Bob. At this time, it is necessary for Chuck to receive information of a bit string which Alice wants to commit or setting information of an EPR pair to be generated by Chuck from Alice beforehand.

(E2) Alice computes 2l-element codeword $E(B) = (e_1, \ldots, e_N) \in \{0, \ldots, 2l-1\}^N$ corresponding to the bit string B to be committed.

(E3) Alice computes $F = (f_1, \ldots, f_N) \in \{0, \ldots, p-1\}^N$ (here, $f_i$ is the greatest integer that does not exceed $e_i/2$ as shown in the expression (6)).

[Expression 2]

$$f_i = \lfloor e_i/2 \rfloor \quad (6)$$

(E4) Bob generates l-element random string $R = (r_1, \ldots, r_N) \in \{0, \ldots, l-1\}^N$.

(E5) For $i=1, \ldots, N$, Alice observes using a base $M(f_i)$ and sets the result as $c_i$. That is, if the observed state is $|M(f_i); j\rangle$, it is set as $c_i \leftarrow j$ (at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$). Hereinafter, these results are collectively expressed as $C = (c_1, \ldots, c_N)$.

(E6) For $i=1, \ldots, N$, Bob observes using a base $M(r_i)$ and sets the result as $d_i$. That is, if the observed state is $|M(r_i); j\rangle$, it is set $d_i \leftarrow j$ (at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$). Hereinafter, these results are collectively expressed as $D = (d_1, \ldots, d_N)$.

(E7) Bob maintains D.

(E8) Alice computes $c'_i = c_i + e_i \mod 2$, and sends Bob the result $C' = (c'_1, \ldots, c'_N)$. Bob maintains C'.

Here, Alice maintains the bit string $C' = (c'_1, \ldots, c'_N)$ as an evidence.

At the above step (E1), "to send one piece of each pairs of the states" means as follows more precisely:

The following expression (7) is state space which can be handled by Chuck.

[Expression 3]

$$H^C = H_1^A \times \ldots \times H_N^A \times H_1^B \times \ldots \times H_N^B \quad (7)$$

Here, it is assumed that the following values (8) and (9) are two-dimensional complex vector space:

[Expression 4]

$$H_i^A \quad (8)$$

$$H_i^B \quad (9)$$

Then, it is assumed that Chuck generates an EPR pair as the following expression (10) for each i, and sends the state which belongs to the value (8) to Alice and the state which belongs to the value (9) to Bob.

[Expression 5]

$$|\Psi_{EPR}\rangle = \frac{1}{\sqrt{2}}(|\uparrow\rangle_i^A |\downarrow\rangle_i^B - |\downarrow\rangle_i^A |\uparrow\rangle_i^B) \in H_i^A \times H_i^B \quad (10)$$

Next, the following shows operation procedure of the open phase of Alice and Bob according to the present embodiment.

(E9) Alice sends Bob the bit string B.

(E10) Bob computes the codeword $E(B) = (e_1, \ldots, e_N) \in \{0, \ldots, 2l-1\}^N$.

(E11) Bob sets $k \leftarrow 0$.

(E12) For $i=1, \ldots, N$, when $r_i = f_i$ and also $d_i \equiv c'_i + e_i \mod 2$, it is set $k \leftarrow k+1$.

(E13) If $k > t$, Bob rejects Alice's commitment. If $k \leq t$, Bob accepts Alice's commitment.

For a certain i, it is assumed that the following condition is satisfied:

$$r_i = f_i \text{ and also } d_i \equiv c'_i + 1 \mod 2 \quad (11)$$

(at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$). This means that Alice and Bob measure i-th state using the same base, and the results are different each other (when observing the EPR pair, if Alice and Bob use the same bases, not the same states but different states are observed). At this time, Bob is able to confirm that the value of $e_i$ claimed by Alice is certainly correct. On the contrary, if the expression (11) is not established for at least one of $i \in \{1, \ldots, N\}$, Bob judges that Alice was dishonest.

However, practically, there exists noise in the communication channel and observation errors. Because of this, even if Alice is not dishonest, the expression (11) may not be established at a certain probability. Therefore, by setting a threshold value $t \geq 1$, when i that satisfies the expression (11) is less than t, it is defined that the commitment should be accepted. A concrete value of t is determined according to noise in the communication channel and observation errors.

The above steps (E11) through (E13) are an example of procedures for the above judgment, and the method shown above using the variable k is also merely one of examples.

Embodiment 4

The configuration of the third embodiment includes, in addition to Alice and Bob, Chuck as a reliable third party. However, the role of Chuck can be taken by Alice.

FIG. 5 shows a block diagram showing a configuration of quantum cryptography communication system according to the present embodiment.

A quantum communication channel 41 is a communication channel for sending/receiving a quantum between the sending device (Alice) 6 and the receiving device (Bob) 7.

A classical communication channel 42 is a communication channel that carries out normal communication (instead of sending a quantum state, but sending digital or analog data) between the sending device 6 and the receiving device 7, and is implemented on, for example, telephone lines, optical fibers, the Internet, electric wave, etc.

A sending device controlling unit 43 of the sending device 6 and a receiving device controlling unit 46 of the receiving device 7 carry out data input, computation, recordation, random number generation, etc., and is implemented by programs of a computer, etc.

A data sending unit 45 of the sending device 6 and a data receiving unit 48 of the receiving device 7 carry out communication through the classical communication channel 42, and the data sending unit 45 and the data receiving unit 48 send/receive data according to instructions of the sending device controlling unit 43 and the receiving device controlling unit 46, respectively. The data sending unit 45 and the data receiving unit 48 are implemented on, for example, a modem, a LAN card, a telephone set, a radio wave transceiver, etc.

An EPR pair generating unit 44 of the sending device 6 generates an EPR pair according to an instruction of the sending device controlling unit 43, and sends one piece of the EPR pair to the quantum communication channel 41. The quantum state of the other one piece of the EPR pair is observed.

The sending device controlling unit 43 receives the observation result from the EPR pair generating unit 44, computes the observation result, and sends to the classical communication channel 42 through the data sending unit 45.

A carrier receiving unit 47 of the receiving device 7 receives a quantum carrier according to the instruction of the receiving device controlling unit 46 and observes its quantum state.

The receiving device controlling unit 46 receives the observation result from the carrier receiving unit 47 and records the observation result in a memory unit 49. Further, after received by the data receiving unit 48, the observation result of the EPR pair generating unit 44 of the sending device 6 is recorded in the memory unit 49. Further, computation is done using the observation result recorded in the memory unit 49 and the data received by the data receiving unit 48, and the result of cryptography communication which is derived from the computation is output.

In the present embodiment, the operation procedure in which Alice is the sending device 6 and Bob is the receiving device 7 is the same as one of the third embodiment. However, the operation of Chuck in the third embodiment should be read as an operation of Alice.

Embodiment 5

As well as the fourth embodiment, Chuck's role in the third embodiment can be also taken by Bob.

FIG. 6 shows a block diagram showing a configuration of quantum cryptography communication system according to the present embodiment.

A quantum communication channel 51 is a communication channel for sending/receiving a quantum between the sending device (Alice) 8 and the receiving device (Bob) 9.

A classical communication channel 52 is a communication channel that carries out normal communication (communication not for sending the quantum state, but sending digital or analog data) between the sending device 8 and the receiving device 9, and is implemented on, for example, telephone lines, fiber optic, the Internet, electric wave, etc.

A sending device controlling unit 53 of the sending device 8 and a receiving device controlling unit 56 of the receiving device 9 carry out data input, computation, recordation, random number generation, etc., and is implemented by programs of a computer, etc.

A data sending unit 55 of the sending device 8 and a data receiving unit 58 of the receiving device 9 carry out communication through the classical communication channel 52, and the data sending unit 55 and the data receiving unit 58 send/receive data according to instructions of the sending device controlling unit 53 and the receiving device controlling unit 56, respectively. The data sending unit 55 and the data receiving unit 58 are implemented on, for example, a modem, a LAN card, a telephone set, a radio wave transceiver, etc.

An EPR pair generating unit 57 of the receiving device 9 generates an EPR pair according to an instruction of the receiving device controlling unit 56, and sends one piece of the EPR pair to the quantum communication channel 51. The quantum state of the other piece of the EPR pair is observed.

A carrier receiving unit 54 of the sending device 8 receives a quantum carrier according to an instruction of the sending device controlling unit 53 and observes its quantum state.

The sending device controlling unit 53 receives the observation result from the carrier receiving unit 54, computes the observation result, and then outputs to the classical communication channel 52 through the data sending unit 55.

The receiving device controlling unit 56 receives the observation result from the EPR pair generating unit 57 and records the observation result in a memory unit 59. Further, after received by the data receiving unit 58, the observation result of the carrier receiving unit 54 of the sending device 8 is recorded in the memory unit 59. Further, computation is done using the observation result recorded in the memory unit 59 and the data received by the data receiving unit 58, and the result of cryptography communication which is derived from the computation is output.

In the present embodiment, the operation procedure in which Alice is the sending device 8 and Bob is the receiving device 9 is the same as one of the third embodiment. However, the operation of Chuck in the third embodiment should be read as an operation of Bob.

Embodiment 6

The orthonormal base $M(i)=\{|M(i);0\rangle, \ldots, M(i); D-1)\}$ in the third embodiment is selected to be covariant under effect of a certain finite group G.

It is assumed that G is a finite group, and its (unitary) expression in a D-dimensional vector space is $U(g)$ (here, $g \in G$).

At this time, for $\forall i$ and $\forall g \in G$, $U(g) M(i)=\{U|M(i);0\rangle, \ldots, U|M(i); D-1)\}$ is equal to one of $M(1), \ldots, M(l)$ (at this time, states that differ merely in complex phases are deemed as identical. Namely, for a certain real number $\theta$, $|\phi\rangle$ and $|\phi'\rangle$ are deemed as identical that satisfy $|\phi\rangle = e^{i\theta}|\phi'\rangle$).

As discussed above, the quantum bit string commitment device which has been explained in the first through sixth embodiments, is characterized in that after the receiver observing the quantum state received from the sender using the base selected at random, the bit string is verified by comparing with the bit string opened by the receiver. Because of this, it is unnecessary to maintain the quantum state for a long time, which facilitates implementation.

Further, the method is characterized in that after converting the bit string $B=(b_1, \ldots, b_m)$ to be committed into the q-element string $A=(a_1, \ldots, a_n)$, and further converting into the codeword $E(B)=(e_1, \ldots, e_N)$ using a (N, n, d) error correcting code, the state $|\phi(e_1)\rangle, \ldots, |\phi(e_N)\rangle$ is sent.

Here, it is assumed that a physical object having a degree of freedom expressed by the D-dimensional complex vector space (this is called "carrier" for descriptive purpose) is used. Further, $|\phi(0)\rangle, \ldots, |\phi(q-1)\rangle$ is a quantum state selected arbitrarily from the D-dimensional complex vector space.

According to this method, although it is necessary to generate an EPR pair, quantum entanglement among different EPR pairs is not necessary. This facilitates implementation.

Embodiment 7

By employing any of devices of the first through sixth embodiments, it is possible to carry out commitment of all kinds of electronic data such as contract documents, image data, speech data, etc.

For example, between two parties of Alice and Bob, it is assumed that Alice determines a certain electronic data B (=m bits) at a time $T_1$, but does not want to open the contents to Bob before a time $T_2$. On the other hand, it is also assumed that Bob wants a guarantee that Alice does not change the data B after the time $T_1$.

At this time, it is assumed that QBSC is performed for the data B. In general, when a bit length $b_{lk}$ is sufficiently large, it is possible to make the bit length $b_{lk}$ which is leaked to Bob sufficiently smaller than m by adjusting parameters of the QBSC protocol (the way to select the value of q, the method of (N, n, d) code E, and the base M(i) used in the above first through sixth embodiments). In this case, actually Bob can hardly know the contents of the data B. On the other hand, since Bob receives the evidence previously through the commitment, it is possible for Bob to confirm that Alice does not change the contents.

For example, the following applications can be considered:
  in games such as Japanese chess or chess, when a person wants to do a sealed move
  when contents of a contract is determined at a certain time point $T_1$ but a person want to open it at $T_2$ which is after $T_1$. Furthermore, the person wants to guarantee that the contents have not been changed since $T_1$. For example, although a company wants to show that a certain contract is determined at a time point $T_1$ outpacing another company, but on the other hand, wants to open the fact after a time point $T_2$ in consideration of effect to insider trading.

In each of the above discussed embodiments, the sending device 1, the receiving device 2, the sending device 3, the receiving device 4, the generating device 5, the sending device 6, the receiving device 7, the sending device 8, and the receiving device 9 can be implemented by computers.

Not shown in the figures, the sending device 1, the receiving device 2, the sending device 3, the receiving device 4, the generating device 5, the sending device 6, the receiving device 7, the sending device 8, and the receiving device 9 include a CPU (Central Processing Unit) that executes programs.

For example, a CPU is connected to a ROM (Read Only Memory), a RAM (Random Access Memory), a communication board, a display unit, a K/B (Keyboard), a mouse, an FDD (Flexible Disk Drive), a CDD (Compact Disk Drive), a magnetic disk drive, an optical disk drive, a printer device, a scanner device, etc.

A RAM is an example of volatile memories. The ROM, the FDD, the CDD, the magnetic disk drive, and the optical disk drive are examples of non-volatile memories. These are examples of a memory device.

In the foregoing embodiments, data or information handled by the sending device 1, the receiving device 2, the sending device 3, the receiving device 4, the generating device 5, the sending device 6, the receiving device 7, the sending device 8, and the receiving device 9 is stored in a memory device and recorded and read by each unit of the sending device 1, the receiving device 2, the sending device 3, the receiving device 4, the generating device 5, the sending device 6, the receiving device 7, the sending device 8, and the receiving device 9.

Further, a communication board is connected to, for example, LAN, the Internet, WAN (Wide Area Network) such as ISDN, etc.

A magnetic disk drive stores an operating system (OS), a window system, a group of programs, and a group of files (database).

A group of programs are implemented by a CPU, an OS, or a window system.

A part of or all of each unit of the sending device 1, the receiving device 2, the sending device 3, the receiving device 4, the generating device 5, the sending device 6, the receiving device 7, the sending device 8, and the receiving device 9 can be configured by programs that is executable by computers. Or it is also possible to implement by firmware stored in a ROM. Or it is also possible to implement by software, by hardware, or a combination of software, hardware, and firmware.

The above group of programs store programs to have a CPU execute processes that have been explained as "—unit" in the explanation of the embodiments. These programs are composed using computer languages such as C language, HTML, SGML, or XML, for example.

Further, the above programs are stored in recording medium such as a magnetic disk drive, an FD (Flexible Disk), an optical disk, a CD (Compact Disk), an MD (Mini Disk), a DVD (Digital Versatile Disk), etc. and read and executed by a CPU.

BRIEF EXPLANATION OF THE DRAWINGS

FIG. 7 shows a conceptual diagram showing a conventional quantum bit string commitment method shown in Non-patent document 1.

Figure 1:
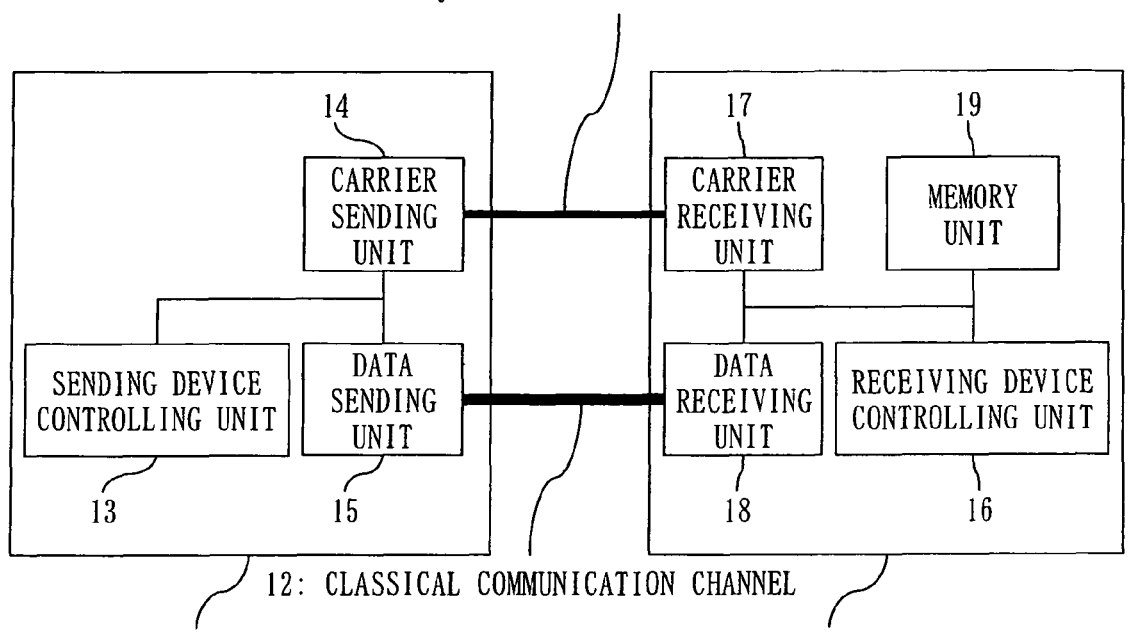
FIG. 1 shows a block diagram showing configuration of a quantum cryptography communication system according to the first embodiment.
Figure 2:
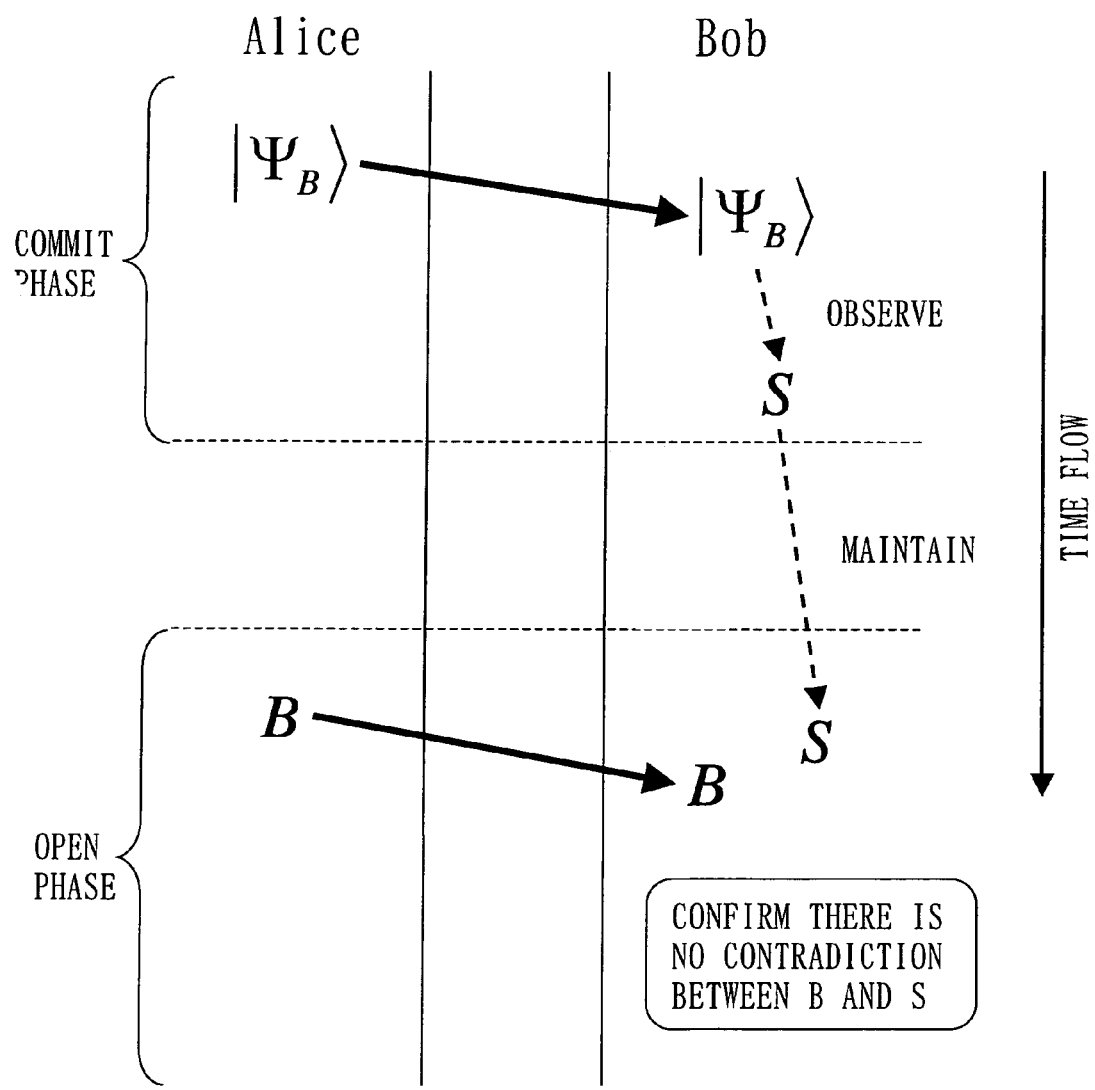
FIG. 2 shows a conceptual diagram showing a quantum bit string commitment method according to the first embodiment.
Figure 3:
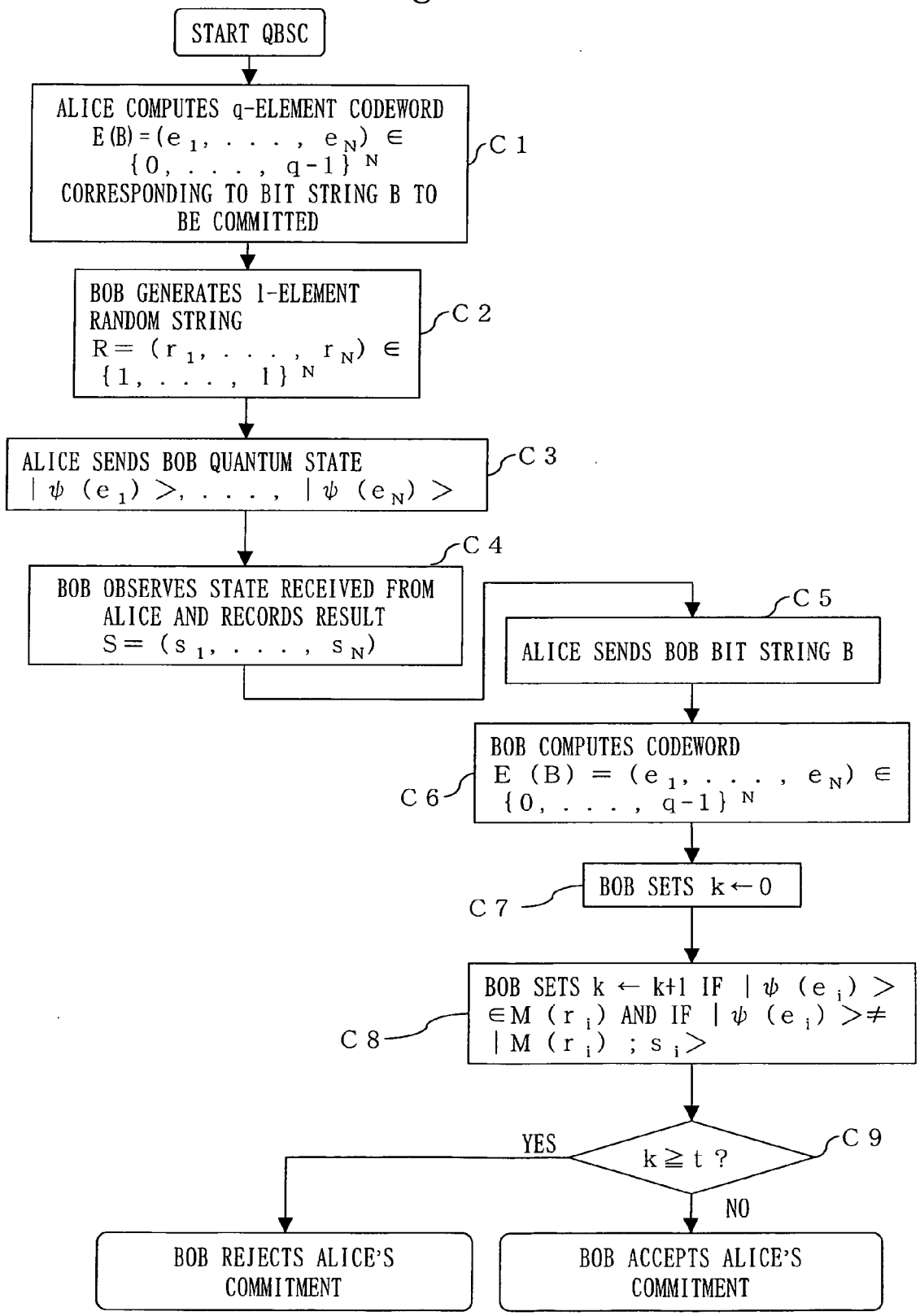
FIG. 3 is a flow diagram showing a quantum cryptography communication method according to the first embodiment.
Figure 4:
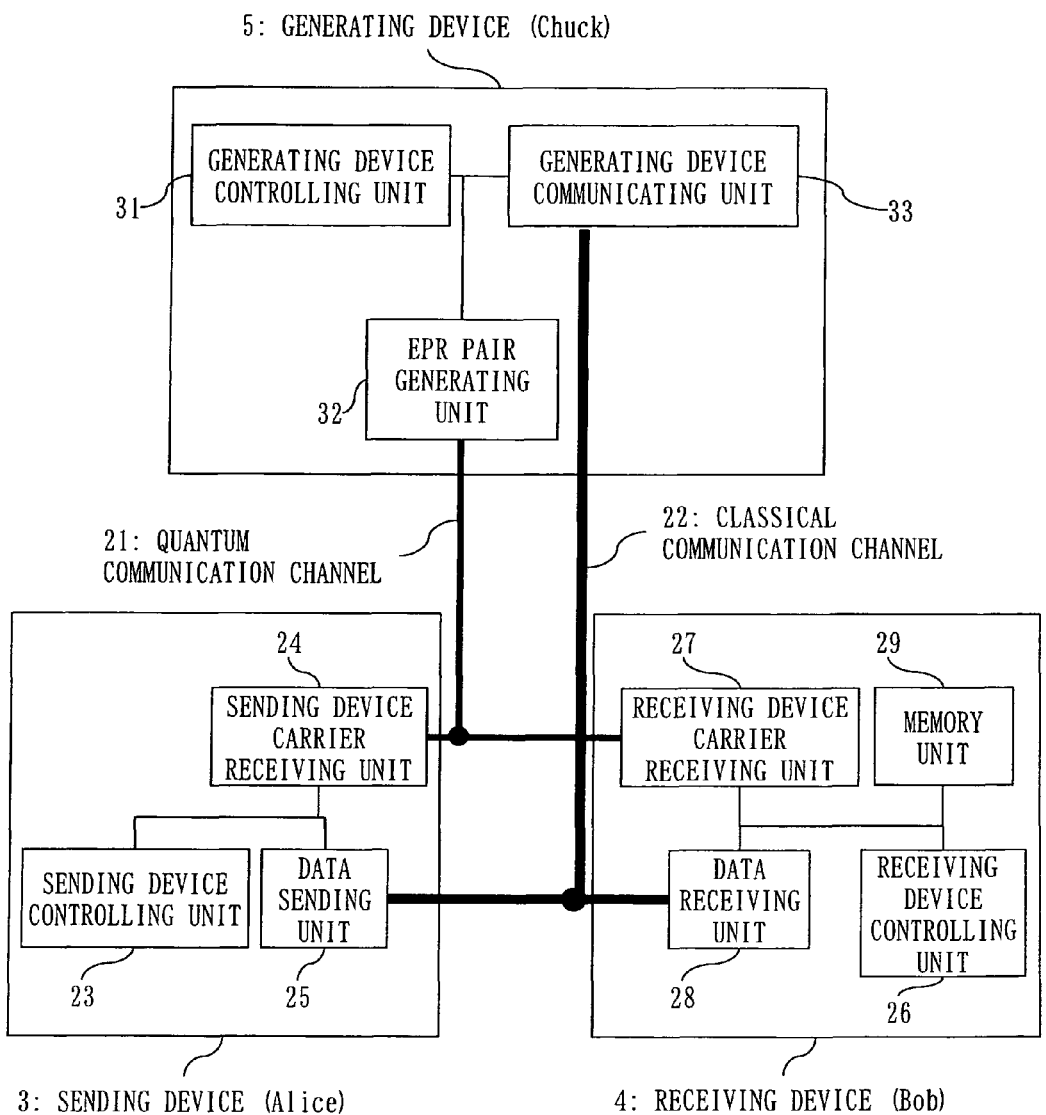
FIG. 4 shows a block diagram showing a configuration of quantum cryptography communication system according to the third embodiment.
Figure 5:
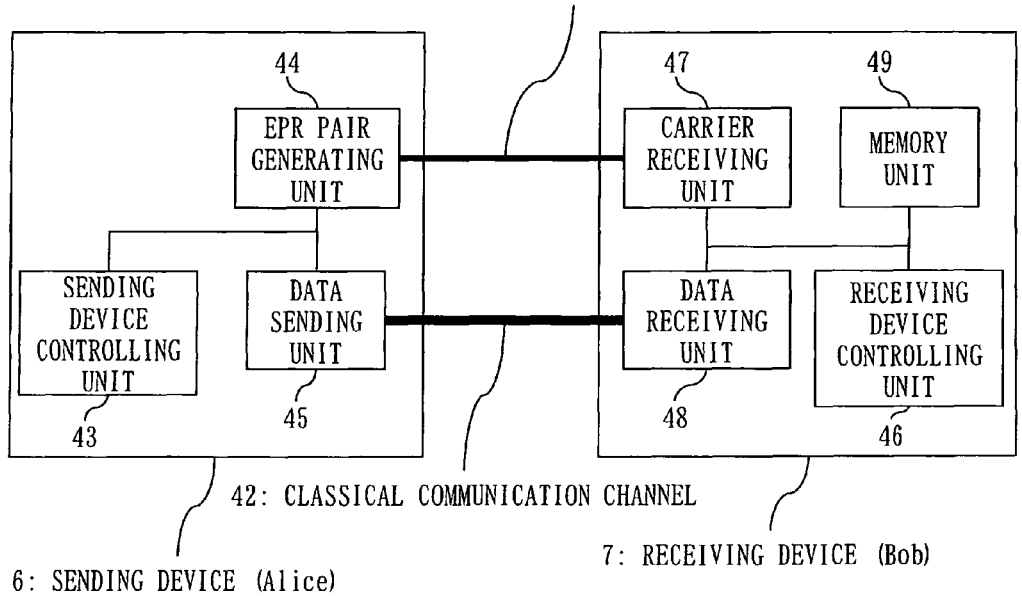
FIG. 5 shows a block diagram showing a configuration of quantum cryptography communication system according to the fourth embodiment.
Figure 6:
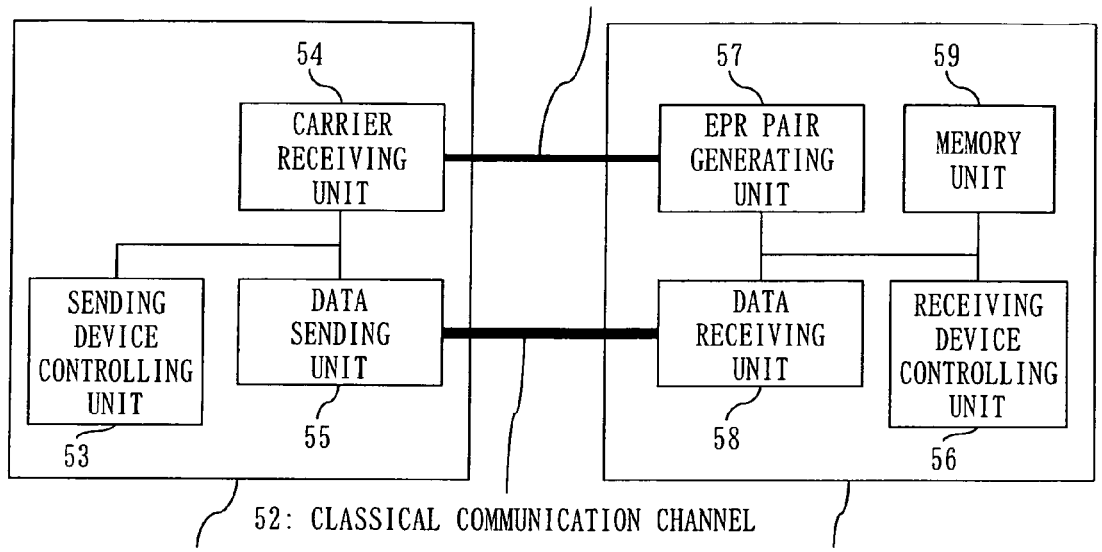
FIG. 6 shows a block diagram showing a configuration of quantum cryptography communication system according to the fifth embodiment.

EXPLANATION OF SIGNS 1, 3, 6, 8: a sending device (Alice); 2, 4, 7, 9: a receiving device (Bob); 5: a generating device (Chuck); 11, 21, 41, 51: a quantum communication channel; 12, 22, 42, 52: a classical communication channel; 13, 23, 43, 53: a sending device controlling unit; 14: a carrier sending unit; 15, 25, 45, 55: a data sending unit; 16, 26, 46, 56: a receiving device controlling unit; 17, 47, 54: a carrier receiving unit; 18, 28, 48, 58: a data receiving unit; 19, 29, 49, 59: a memory unit; 24: a sending device carrier receiving unit; 27: a receiving device carrier receiving unit; 31: a generating device controlling unit; 32, 44, 57: an EPR (Einstein-Podolsky-Rosen) pair generating unit; and 33: a generating device communicating unit.

The invention claimed is:

1. A quantum cryptography communication system carrying out bit string commitment using a quantum, comprising:
   a quantum communication channel transmitting the quantum;
   a classical communication channel transmitting a bit string;
   a sending device sending the quantum to the quantum communication channel and sending the bit string to the classical communication channel; and
   a receiving device receiving the quantum from the quantum communication channel and receiving the bit string from the classical communication channel;
   wherein the sending device includes;
      a sending device controlling unit inputting/outputting a bit string having a plurality of bits to be committed which is a target of commitment;
      a carrier sending unit inputting the data from the sending device controlling unit sending a quantum corresponding to the bit string to be committed to the quantum communication channel; and
      a data sending unit sending a whole of the bit string to be committed of which the quantum has been sent by the carrier sending unit to the classical communication channel; and
   wherein the receiving device includes;
      a carrier receiving unit receiving the quantum sent to the quantum communication channel by the carrier sending unit and observing a quantum state of the quantum;
      a memory unit storing an observation result of the quantum state observed by the carrier receiving unit;
      a data receiving unit receiving the bit string to be committed sent to the classical communication channel by the data sending unit; and
      a receiving device controlling unit comparing the observation result stored by the memory unit with the bit string to be committed received by the data receiving unit.

2. The quantum cryptography communication system of claim 1, wherein:
   the sending device controlling unit converts the bit string to be committed to a codeword using an error correcting code;
   the carrier sending unit inputs the codeword from the sending device controlling unit and sends a quantum corresponding to the codeword input to the quantum communication channel;
   the data sending unit inputs the bit string to be committed from the sending device controlling unit and sends the whole of the bit string to be committed input to the classical communication channel; and
   the receiving device controlling unit compares the observation result stored by the memory unit with the codeword converted from the bit string received by the data receiving unit using the error correcting code.

3. A quantum cryptography communication system carrying out bit string commitment using a photon, comprising:
   a quantum communication channel transmitting the photon;
   a classical communication channel transmitting a bit string;
   a sending device sending the photon to the quantum communication channel and sending the bit string to the classical communication channel; and
   a receiving device receiving the photon from the quantum communication channel and receiving the bit string from the classical communication channel;
   wherein the sending device includes;
      a sending device controlling unit inputting/outputting a bit string having a plurality of bits to be committed which is a target of commitment;
      a carrier sending unit sending a photon corresponding to the bit string to be committed to the quantum communication channel; and
      a data sending unit sending the whole of the bit string to be committed of which the photon has been sent by the carrier sending unit to the classical communication channel; and
   wherein the receiving device includes;
      a carrier receiving unit receiving the photon sent to the quantum communication channel by the carrier sending unit and observing a polarization state of the photon;
      a memory unit storing an observation result of the polarization state observed by the carrier receiving unit;
      a data receiving unit receiving the bit string to be committed sent to the classical communication channel by the data sending unit; and
      a receiving device controlling unit comparing the observation result stored by the memory unit with the bit string to be committed received by the data receiving unit.

4. The quantum cryptography communication system of claim 3, wherein the carrier receiving unit observes a linear polarization as the polarization state of the photon.

5. A quantum cryptography communication system carrying out bit string commitment using a quantum, comprising:
   a quantum communication channel transmitting the quantum;
   a classical communication channel transmitting a bit string;
   a generating device sending the quantum to the quantum communication channel and receiving the data from the classical channel;
   a sending device receiving the quantum from the quantum communication channel and sending the bit string to the classical communication channel; and
   a receiving device receiving the quantum from the quantum communication channel and receiving the bit string from the classical channel;
   wherein the generating device includes
      a generating device communicating unit receiving setting information for generating an EPR (Einstein-Podolsky-Rosen) pair;
      a generating device controlling unit controlling generation of the EPR pair based on the setting information received by the generating device communicating unit; and
      an EPR pair generating unit generating the EPR pair according to an instruction of the generating device controlling unit and sending a piece of the EPR pair to the quantum communication channel,
   wherein the sending device includes;
      a sending device carrier receiving unit receiving the one piece of the EPR pair sent to the quantum communication channel by the EPR pair generating unit and observing a quantum state of the one piece of the EPR pair;
      a sending device controlling unit carrying out an operation using an observation result of the quantum state observed by the sending device carrier receiving unit and a bit string having a plurality of bits to be committed which is a target of commitment; and a data sending unit sending an operation result by the sending device controlling unit to the classical communication channel, and sending a whole of the bit string to be committed to the classical communication channel; and wherein the receiving device includes;

a receiving device carrier receiving unit receiving another piece of the EPR pair sent to the quantum communication channel by the EPR pair generating unit and observing a quantum state of the other piece of the EPR pair;

a data receiving unit receiving the operation result and the bit string to be committed sent to the classical communication channel by the data sending unit;

a memory unit storing the operation result received by the data receiving unit and an observation result of the quantum state observed by the receiving device carrier receiving unit; and a receiving device controlling unit comparing the operation result and the observation results stored by the memory unit with the bit string to be committed received by the data receiving unit.

6. A quantum cryptography communication system carrying out bit string commitment using a quantum, comprising:

a quantum communication channel transmitting the quantum;

a classical communication channel transmitting a bit string;

a sending device sending the quantum to the quantum communication channel and sending the bit string to the classical communication channel; and a receiving device receiving the quantum from the quantum communication channel and receiving the bit string from the classical communication channel, wherein the sending device includes:

an EPR pair generating unit generating an EPR (Einstein-podolsky-Rosen) pair, sending one piece of the EPR pair to the quantum communication channel, and observing a quantum state of another piece of the EPR pair;

a sending device controlling unit carrying out an operation using an observation result of the quantum state observed by the EPR pair generating unit and a bit string having a plurality of bits to be committed which is a target of commitment; and a data sending unit sending an operation result by the sending device controlling unit to the classical communication channel, and sending a whole of the bit string to be committed to the classical communication channel, and wherein the receiving device includes:

a carrier receiving unit receiving the one piece of the EPR pair sent to the quantum communication channel by the EPR pair generating unit and observing a quantum state of the one piece of the EPR pair;

a data receiving unit receiving the operation result and the bit string to be committed sent to the classical communication channel by the data sending unit;

a memory unit storing the operation result received by the data receiving unit and an observation result of the quantum state observed by the carrier receiving unit; and a receiving device controlling unit comparing the operation result and the observation results stored by the memory unit with the bit string to be committed received by the data receiving unit.

7. A quantum cryptography communication system carrying out bit string commitment using a quantum, comprising:

a quantum communication channel transmitting the quantum;

a classical communication channel transmitting a bit string;

a sending device receiving the quantum from the quantum communication channel and sending the bit string to the classical communication channel; and a receiving device sending the quantum to the quantum communication channel and receiving the bit string from the classical communication channel, wherein the receiving device includes:

an EPR pair generating unit generating an EPR (Einstein-Podolsky-Rosen) pair, sending one piece of the EPR pair to the quantum communication channel, and observing a quantum state of another piece of the EPR pair, wherein the sending device includes:

a carrier receiving unit receiving the one piece of the EPR pair sent to the quantum communication channel by the EPR pair generating unit and observing a quantum state of the one piece of the EPR pair a sending device controlling unit carrying out an operation using an observation result of the quantum state observed by the carrier receiving unit and a bit string having a plurality of bits to be committed which is a target of commitment; and a data sending unit sending an operation result by the sending device controlling unit to the classical communication channel, and sending a whole of the bit string to be committed to the classical communication channel, and wherein the receiving device further includes:

a data receiving unit receiving the operation result and the bit string to be committed sent to the classical communication channel by the data sending unit;

a memory unit storing the operation result received by the data receiving unit and an observation result of the quantum state observed by the EPR pair generating unit; and a receiving device controlling unit comparing the operation result and the observation results stored by the memory unit with the bit string to be committed received by the data receiving unit.

8. A receiving device comprising:

a carrier receiving unit receiving a quantum corresponding to a bit string having a plurality of bits to be committed which is a target of commitment from a sending device carrying out bit string commitment, and observing a quantum state of the quantum;

a memory unit storing an observation result of the quantum state observed by the carrier receiving unit;

a data receiving unit receiving a whole of the bit string to be committed from the sending device; and a receiving device controlling unit comparing the observation result stored by the memory unit with the bit string to be committed received by the data receiving unit.

9. The receiving device of claim 8, wherein the receiving device controlling unit compares the observation result stored by the memory unit with a codeword converted from the bit string to be committed received by the data receiving unit using an error correcting code.

10. A receiving device comprising:
- a carrier receiving unit receiving a photon corresponding to a bit string having a plurality of bits to be committed which is a target of commitment from a sending device carrying out bit string commitment, and observing a polarization state of the photon;
- a memory unit storing an observation result of the polarization state observed by the carrier receiving unit;
- a data receiving unit receiving a whole of the bit string to be committed from the sending device; and
- a receiving device controlling unit comparing the observation result stored by the memory unit with the bit string to be committed received by the data receiving unit.

11. The receiving device of claim 10, wherein the carrier receiving unit observes a linear polarization as the polarization state of the photon.

12. A receiving device comprising:
- a carrier receiving unit receiving a photon corresponding to a bit string having a plurality of bits to be committed which is a target of commitment from a sending device carrying out bit string commitment, and observing a phase difference of the photon;
- a memory unit storing an observation result of the phase difference observed by the carrier receiving unit;
- a data receiving unit receiving a whole of the bit string to be committed from the sending device; and
- a receiving device controlling unit comparing the observation result stored by the memory unit with the bit string received by the data receiving unit.

13. A receiving device carrying out communication with a generating device generating an EPR (Einstein-Podolsky-Rosen) pair and sending a piece of the EPR pair and a sending device observing the piece of the EPR pair and carrying out bit string commitment, the receiving device comprising:
- a receiving device carrier receiving unit receiving one piece of the EPR pair from the generating device and observing a quantum state of the one piece of the EPR pair;
- a data receiving unit receiving an operation result obtained by an operation using an observation result of another piece of the EPR pair and a bit string having a plurality of bits to be committed which is a target of commitment, and further receiving a whole of the bit string to be committed from the sending device;
- a memory unit storing the operation result received by the data receiving unit and an observation result of the quantum state observed by the receiving device carrier receiving unit; and
- a receiving device controlling unit comparing the operation result and the observation results stored by the memory unit with the bit string to be committed received by the data receiving unit.

14. A receiving device carrying out communication with a sending device generating an EPR (Einstein-Podolsky-Rosen) pair, observing a piece of the EPR pair, and carrying out bit string commitment, the receiving device comprising:
- a carrier receiving unit receiving one piece of the EPR pair from the sending device and observing a quantum state of the one piece of the EPR pair;
- a data receiving unit receiving an operation result obtained by an operation using an observation result of another piece of the EPR pair and a bit string having a plurality of bits to be committed which is a target of commitment, and further receiving a whole of the bit string to be committed from the sending device;
- a memory unit storing the operation result received by the data receiving unit and an observation result of the quantum state observed by the carrier receiving unit; and
- a receiving device controlling unit comparing the operation result and the observation results stored by the memory unit with the bit string to be committed received by the data receiving unit.

15. A receiving device carrying out communication with a sending device observing a piece of an EPR (Einstein-Podolsky-Rosen) pair and carrying out bit string commitment, the receiving device comprising:
- an EPR pair generating unit generating the EPR pair, sending one piece of the EPR pair to the sending device, and observing a quantum state of another piece of the EPR pair;
- a data receiving unit receiving an operation result obtained by an operation using an observation result of the one piece of the EPR pair and a bit string having a plurality of bits to be committed which is a target of commitment, and further receiving a whole of the bit string to be committed from the sending device;
- a memory unit storing the operation result received by the data receiving unit and an observation result of the quantum state observed by the EPR pair generating unit; and
- a receiving device controlling unit comparing the operation result and the observation results stored by the memory unit with the bit string to be committed received by the data receiving unit.

16. A sending device carrying out communication with a generating device generating an EPR (Einstein-Podolsky-Rosen) pair and sending a piece of the EPR pair and a receiving device observing the piece of the EPR pair and receiving a bit string, the sending device comprising:
- a sending device carrier receiving unit receiving one piece of the EPR pair sent by the generating unit and observing a quantum state of the one piece of the EPR pair;
- a sending device controlling unit carrying out an operation using an observation result of the quantum state observed by the sending device carrier receiving unit and a bit string having a plurality of bits to be committed which is a target of commitment; and
- a data sending unit sending an operation result by the sending device controlling unit to the receiving device, and sending a whole of the bit string to be committed to the receiving device.

17. A sending device carrying out communication with a receiving device observing a piece of an EPR (Einstein-Podolsky-Rosen) pair and receiving a bit string, the sending device comprising:
- an EPR pair generating unit generating the EPR pair, sending one piece of the EPR pair to the receiving device, and observing a quantum state of another piece of the EPR pair;
- a sending device controlling unit carrying out an operation using an observation result of the quantum state observed by the EPR pair generating unit and a bit string having a plurality of bits to be committed which is a target of commitment; and
- a data sending unit sending an operation result by the sending device controlling unit to the receiving device, and sending a whole of the bit string to be committed to the receiving device.

18. A sending device carrying out communication with a receiving device generating an EPR (Einstein-Podolsky-Rosen) pair, observing a piece of the EPR pair, and receiving a bit string, the sending device comprising:

a carrier receiving unit receiving one piece of the EPR pair sent by the receiving device and observing a quantum state of the one piece of the EPR pair;

a sending device controlling unit carrying out an operation using an observation result of the quantum state observed by the carrier receiving unit and a bit string having a plurality of bits to be committed which is a target of commitment; and a data sending unit sending an operation result by the sending device controlling unit to the receiving device and sending a whole of the bit string to be committed to the receiving device.

19. A quantum cryptography communication method for carrying out communication between a sending device sending a quantum to a quantum communication channel transmitting the quantum and sending a bit string to a classical communication channel transmitting the bit string and a receiving device receiving the quantum from the quantum communication channel and receiving the bit string from the classical communication channel, the method comprising:

a sending device controlling step by the sending device for inputting/outputting a bit string having a plurality of bits committed which is a target of commitment in bit string commitment;

a carrier sending step by the sending device for sending a quantum corresponding to the bit string to be committed to the quantum communication channel;

a carrier receiving step by the receiving device for receiving the quantum sent to the quantum communication channel by the carrier sending step and for observing a quantum state of the quantum;

a storing step by the receiving device for storing an observation result of the quantum state observed by the carrier receiving step;

a data sending step by the sending device for sending a whole of the bit string to be committed of which the quantum has been sent by the carrier sending step to the classical communication channel;

a data receiving step by the receiving device for receiving the bit string to be committed sent to the classical communication channel by the data sending step; and a receiving device controlling step by the receiving device for comparing the observation result stored by the storing step with the bit string to be committed received by the data receiving step.

20. A quantum cryptography communication system carrying out bit string commitment using a quantum, comprising:

a sending device connected to a quantum communication channel and a classical communication channel, sending a quantum to the quantum communication channel and sending a bit string to the classical communication channel; and a receiving device connected to the quantum communication channel and the classical communication channel, receiving the quantum from the quantum communication channel and receiving the bit string from the classical communication channel, wherein the sending device includes:

a sending device controlling unit inputting a bit string to be committed which is a target of commitment, converting each bit of the bit string to be committed inputted using an error correction code, and generating a plurality of codeword elements with setting an order within the plurality of codeword elements, the plurality of codeword elements being elements of codeword, each value of which being related to either quantum state out of a plurality of quantum states;

a carrier sending unit, according to the order of the plurality of codeword elements generated by the sending device controlling unit, sending a quantum of a quantum state which is related to each value of each codeword element to the quantum communication channel; and a data sending unit sending the bit string to be committed for which quanta have been sent by the carrier sending unit to the classical communication channel, and wherein the receiving device includes:

a carrier receiving unit receiving the quantum sent to the quantum communication channel by the carrier sending unit and observing a quantum state of the quantum;

a memory unit storing an observation result of the quantum state observed by the carrier receiving unit;

a data receiving unit receiving the bit string to be committed sent to the classical communication channel by the data sending unit; and a receiving device controlling unit comparing the observation result stored by the memory unit with a codeword converted using the error correction code from the bit string to be committed received by the data receiving unit.

21. The quantum cryptography communication system of claim 20, wherein the sending device controlling unit converts the bit string to be committed inputted using the error correction code, and generates a plurality of codeword elements with setting an order within the plurality of codeword elements, each value of which is related to either quantum state out of $(1 \times D)$ quantum states composed of a combination of $1(1 \geqq 2)$ bases and D-dimensional $(D \geqq 2)$ complex vectors.

22. The quantum cryptography communication system of claim 20, wherein the carrier receiving unit selects a base at random, and observes a quantum state of the quantum received.

23. The quantum cryptography communication system of claim 20, wherein the carrier sending unit sends a quantum, to which information amount of more than 1 bit per 1 qubit is assigned, to the quantum communication channel.

24. The quantum cryptography communication system of claim 20, wherein:

the quantum cryptography communication system carries out the bit string commitment using a polarization state of a photon as the quantum state, the sending device controlling unit converts the bit string to be committed inputted using the error correction code, and generates a plurality of codeword elements with setting an order within the plurality of codeword elements, each value of which is related to either polarization state out of a plurality of polarization states;

the carrier sending unit, according to the order of the plurality of codeword elements generated by the sending device controlling unit, sends a photon of the polarization state which is related to each value of each codeword element, to the quantum communication channel; and the carrier receiving unit receives the photon sent to the quantum communication channel by the carrier sending unit, and observes a polarization state of the photon.

25. The quantum cryptography communication system of claim 24, wherein the carrier receiving unit observes a linear polarization as the polarization state of the photon.

26. A quantum cryptography communication system carrying out bit string commitment using a quantum, comprising:
a generating device connected to a quantum communication channel and sending a quantum to the quantum communication channel;
a sending device connected to the quantum communication channel and a classical communication channel, receiving the quantum from the quantum communication channel, and sending a bit string to the classical communication channel; and
a receiving device connected to the quantum communication channel and the classical communication channel, receiving the quantum from the quantum communication channel, and receiving the bit string from the classical communication channel,
wherein the generating device includes:
a generating device communicating unit receiving setting information for generating an EPR (Einstein-Podolsky-Rosen) pair;
a generating device controlling unit controlling generation of the EPR pair based on the setting information received by the generating device communicating unit; and
an EPR pair generating unit generating the EPR pair based on an instruction of the generating device controlling unit and sending a piece of the EPR pair to the quantum communication channel,
wherein the sending device includes:
a sending device carrier receiving unit receiving one piece of the EPR pair sent to the quantum communication channel by the EPR pair generating unit, and observing a quantum state of the one piece of the EPR pair using either base out of a plurality of bases;
a sending device controlling unit carrying out an operation using an observation result of the quantum state observed by the sending device carrier receiving unit and a bit string to be committed which is a target of commitment; and
a data sending unit sending an operation result by the sending device controlling unit to the classical communication channel and sending the bit string to be committed to the classical communication channel, and
wherein the receiving device includes:
a receiving device carrier receiving unit receiving another piece of the EPR pair sent to the quantum communication channel by the EPR pair generating unit and observing a quantum state of the other piece of the EPR pair;
a data receiving unit receiving the operation result and the bit string to be committed sent to the classical communication channel by the data sending unit;
a memory unit storing the operation result received by the data receiving unit and an observation result of the quantum state observed by the receiving device carrier receiving unit; and
a receiving device controlling unit comparing the operation result and the observation result stored by the memory unit with the bit string to be committed received by the data receiving unit,
in the sending device,
wherein the sending device controlling unit:
converts the bit string to be committed using an error correction code, and generates a plurality of codeword elements with setting an order within the plurality of codeword elements, the plurality of codeword elements being elements of codeword; and
according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and
wherein the sending device carrier receiving unit:
receives a same number of one pieces of EPR pairs as the plurality of calculated values in series; and
according to the order of the plurality of calculated values, using the base which is related to each of the calculated values, observes quantum states of the one pieces of EPR pairs received.

27. A quantum cryptography communication system carrying out bit string commitment using a quantum, comprising:
a sending device connected to a quantum communication channel and a classical communication channel, sending a quantum to the quantum communication channel and sending a bit string to the classical communication channel; and
a receiving device connected to the quantum communication channel and the classical communication channel, receiving the quantum from the quantum communication channel and receiving the bit string from the classical communication channel,
wherein the sending device includes:
an EPR pair generating unit generating an EPR (Einstein-Podolsky-Rosen) pair, sending one piece of the EPR pair to the quantum communication channel, and observing a quantum state of another piece of the EPR pair using either base out of a plurality of bases;
a sending device controlling unit carrying out an operation using an observation result of the quantum state observed by the EPR pair generating unit and a bit string to be committed which is a target of commitment; and
a data sending unit sending an operation result by the sending device controlling unit to the classical communication channel and sending the bit string to be committed to the classical communication channel,
wherein the receiving device includes:
a carrier receiving unit receiving the one piece of the EPR pair sent to the quantum communication channel by the EPR pair generating unit and observing a quantum state of the one piece of the EPR pair;
a data receiving unit receiving the operation result and the bit string to be committed sent to the classical communication channel by the data sending unit;
a memory unit storing the operation result received by the data receiving unit and an observation result of the quantum state observed by the carrier receiving unit; and
a receiving device controlling unit comparing the operation result and the observation result stored by the memory unit with the bit string to be committed received by the data receiving unit,
in the sending device,
wherein the sending device controlling unit:
converts the bit string to be committed using an error correction code and generating a plurality of codeword elements with setting an order within the plurality of codeword elements, the plurality of codeword elements being elements of codeword; and
according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and wherein the EPR pair generating unit:

generates a same number of EPR pairs as the plurality of calculated values in series; and according to the order of the plurality of calculated values, using the base which is related to each of the calculated values, observes quantum states of another pieces of EPR pairs generated.

28. A quantum cryptography communication system carrying out bit string commitment using a quantum comprising:

a sending device connected to a quantum communication channel and a classical communication channel, receiving a quantum from the quantum communication channel, and sending a bit string to the classical communication channel; and a receiving device connected to the quantum communication channel and the classical communication channel, sending the quantum to the quantum communication channel, and receiving the bit string from the classical communication channel, wherein the receiving device includes an EPR pair generating unit generating an EPR (Einstein-Podolsky-Rosen) pair, sending one piece of the EPR pair to the quantum communication channel, and observing a quantum state of another piece of the EPR pair, wherein the sending device includes:

a carrier receiving unit receiving the one piece of the EPR pair sent to the quantum communication channel by the EPR pair generating unit, and observing a quantum state of the one piece of the EPR pair using either base out of a plurality of bases;

a sending device controlling unit carrying out an operation using an observation result of the quantum state observed by the carrier receiving unit and a bit string to be committed which is a target of commitment; and a data sending unit sending an operation result by the sending device controlling unit to the classical communication channel and sending the bit string to be committed to the classical communication channel, and wherein the receiving device further includes:

a data receiving unit receiving the operation result and the bit string to be committed sent to the classical communication channel by the data sending unit;

a memory unit storing the operation result received by the data receiving unit and an observation result of the quantum state observed by the EPR pair generating unit; and a receiving device controlling unit comparing the operation result and the observation result stored by the memory unit with the bit string to be committed received by the data receiving unit, in the sending device, wherein the sending device controlling unit:

converts the bit string to be committed using an error correction code, and generates a plurality of codeword elements with setting an order within the plurality of codeword elements, the plurality of codeword elements being elements of codeword; and according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and wherein the sending device carrier receiving unit:

receives a same number of one pieces of EPR pairs as the plurality of calculated values in series; and according to the order of the plurality of calculated values, using the base which is related to each of the calculated values, observes quantum states of the one pieces of EPR pairs received.

29. A sending device carrying out bit string commitment using a quantum to a receiving device, the sending device comprising:

a sending device controlling unit inputting a bit string to be committed which is a target of commitment, converts the bit string to be committed inputted using an error correction code, and generates a plurality of codeword elements with setting an order within the plurality of codeword elements, the plurality of codeword elements being elements of codeword, each value of which being related to either quantum state out of a plurality of quantum state;

a carrier sending unit, according to the order of the plurality of codeword elements generated by the sending device controlling unit, sending a quantum of a quantum state which is related to each value of each codeword element to the receiving device; and a data sending unit sending the bit string to be committed for which quanta have been sent by the carrier sending unit to the receiving device.

30. The sending device of claim 29, wherein the sending device controlling unit converts the bit string to be committed inputted using the error correction code, and generates a plurality of codeword elements with setting an order within the plurality of codeword elements, each value of which is related to either quantum state out of (1×D) quantum states composed of a combination of 1 (1≧2) bases and D-dimensional (D≧2) complex vectors.

31. The sending device of claim 29, wherein the carrier sending unit sends a quantum, to which information amount of more than 1 bit per 1 qubit is assigned, to the receiving device.

32. The sending device of claim 29, wherein:

the sending device carries out the bit string commitment using a polarization state of a photon as the quantum state, the sending device controlling unit converts the bit string to be committed inputted using the error correction code, and generates a plurality of codeword elements with setting an order within the plurality of codeword elements, each value of which is related to either polarization state out of a plurality of polarization states, and the carrier sending unit, according to the order of the plurality of codeword elements generated by the sending device controlling unit, for each of the codeword elements, sends a photon of the polarization state which is related to each value of each codeword element to the receiving device.

33. A sending device carrying out communication with a generating device generating an EPR (Einstein-Podolsky-Rosen) pair and sending a piece of the EPR pair and a receiving device observing the piece of the EPR pair, and carrying out bit string commitment using a quantum to the receiving device, the sending device comprising:

a sending device carrier receiving unit receiving one piece of the EPR pair sent by the generating device, and observing a quantum state of the one piece of the EPR pair using either base out of a plurality of bases;

a sending device controlling unit carrying out an operation using an observation result of the quantum state observed by the sending device carrier receiving unit and a bit string to be committed which is a target of commitment; and a data sending unit sending an operation result by the sending device controlling unit to the receiving device, and sending the bit string to be committed to the receiving device, wherein the sending device controlling unit:

converts the bit string to be committed using an error correction code and generates a plurality of codeword elements with setting an order within the plurality of codeword elements, the plurality of codeword elements being elements of codeword; and according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and wherein the sending device carrier receiving unit:

receives a same number of one pieces of EPR pairs as the plurality of calculated values in series; and according to the order of the plurality of calculated values, using the base which is related to each of the calculated values, observes quantum states of the one pieces of EPR pairs received.

34. A sending device carrying out communication with a receiving device observing a piece of an EPR (Einstein-Podolsky-Rosen) pair, and carrying out bit string commitment using a quantum to the receiving device, the sending device comprising:

an EPR pair generating unit generating an EPR pair, sending one piece of the EPR pair to the receiving device, and observing a quantum state of another piece of the EPR pair using either base out of a plurality of bases;

a sending device controlling unit carrying out an operation using an observation result of the quantum state observed by the EPR pair generating unit and a bit string to be committed which is a target of commitment; and a data sending unit sending an operation result by the sending device controlling unit to the receiving device, and sending the bit string to be committed to the receiving device, wherein the sending device controlling unit:

converts the bit string to be committed using an error correction code, and generates a plurality of codeword elements with setting an order within the plurality of codeword elements, the plurality of codeword elements being elements of codeword; and according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and wherein the EPR pair generating unit:

generates a same number of EPR pairs as the plurality of calculated values in series; and according to the order of the plurality of calculated values, using the base which is related to each of the calculated values, observes quantum states of another pieces of EPR pairs generated.

35. A sending device carrying out communication with a receiving device generating an EPR (Einstein-Podolsky-Rosen) pair, sending one piece of the EPR pair, and observing another piece of the EPR pair, and carrying out bit string commitment using a quantum to the receiving device, the sending device comprising:

a carrier receiving unit receiving the one piece of the EPR pair sent by the receiving device, and observing a quantum state of the one piece of the EPR pair using either base out of a plurality of bases;

a sending device controlling unit carrying out an operation using an observation result of the quantum state observed by the carrier receiving unit and a bit string to be committed which is a target of commitment; and a data sending unit sending an operation result by the sending device controlling unit to the receiving device, and sending the bit string to be committed to the receiving device, wherein the sending device controlling unit:

converts the bit string to be committed using an error correction code, and generates a plurality of codeword elements with setting an order within the plurality of codeword elements, the plurality of codeword elements being elements of codeword; and according to the order of the plurality of codeword elements, carries out a predetermined calculation for each of the codeword elements, obtains a calculated value which is related to either base out of the plurality of bases for each of the codeword elements, and conforms an order of the plurality of calculated values to the order of the plurality of codeword elements, and wherein the sending device carrier receiving unit:

receives a same number of one pieces of EPR pairs as the plurality of calculated values in series; and according to the order of the plurality of calculated values, using the base which is related to each of the calculated values, observes quantum states of the one pieces of EPR pairs received.

* * * * *